United States Patent
Matsumura et al.

(10) Patent No.: US 12,526,105 B2
(45) Date of Patent: Jan. 13, 2026

(54) TERMINAL AND RADIO COMMUNICATION METHOD

(71) Applicant: NTT DOCOMO, INC., Tokyo (JP)

(72) Inventors: Yuki Matsumura, Tokyo (JP); Shohei Yoshioka, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 3 days.

(21) Appl. No.: 17/625,954

(22) PCT Filed: Jul. 17, 2019

(86) PCT No.: PCT/JP2019/028129
§ 371 (c)(1),
(2) Date: Jan. 10, 2022

(87) PCT Pub. No.: WO2021/009874
PCT Pub. Date: Jan. 21, 2021

(65) Prior Publication Data
US 2022/0247536 A1    Aug. 4, 2022

(51) Int. Cl.
*H04L 5/00* (2006.01)

(52) U.S. Cl.
CPC .......... *H04L 5/0051* (2013.01); *H04L 5/006* (2013.01)

(58) Field of Classification Search
None
See application file for complete search history.

(56) References Cited

U.S. PATENT DOCUMENTS

| | | | |
|---|---|---|---|
| 10,608,800 B2* | 3/2020 | Ko | H04L 5/0057 |
| 10,819,407 B2* | 10/2020 | Park | H04B 7/0486 |
| 2018/0367287 A1* | 12/2018 | Chen | H04L 25/0224 |
| 2019/0116594 A1* | 4/2019 | Kwak | H04L 5/0096 |
| 2019/0165979 A1 | 5/2019 | Yang et al. | |
| 2021/0160880 A1* | 5/2021 | Zhang | H04W 72/23 |
| 2021/0167821 A1* | 6/2021 | Chen | H04B 7/0617 |
| 2021/0320704 A1* | 10/2021 | Hao | H04B 7/0469 |
| 2022/0085931 A1* | 3/2022 | Mondal | H04W 72/23 |

OTHER PUBLICATIONS

International Search Report issued in PCT/JP2019/028129 on Jan. 28, 2020 (2 pages).
Written Opinion of the International Searching Authority issued in PCT/JP2019/028129 on Jan. 28, 2020 (4 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

*Primary Examiner* — Luna Weissberger
(74) *Attorney, Agent, or Firm* — Osha Bergman Watanabe & Burton LLP

(57) ABSTRACT

A terminal according to an aspect of the present disclosure includes: a receiving section that receives a first channel state information (CSI)-reference signal (RS) based on a sequence having a peak-to-average power ratio (PAPR) which is lower than a PAPR of a pseudo-random sequence; and a control section that performs measurement by using the first CSI-RS. It is possible to appropriately perform communication even in a case of utilizing a high frequency band.

5 Claims, 39 Drawing Sheets

FIG. 1

| Row | Ports $X$ | Density $\rho$ | cdm-Type | $(\bar{k}, \bar{l})$ | CDM group index $j$ | $k'$ | $l'$ |
|---|---|---|---|---|---|---|---|
| 1 | 1 | 3 | No CDM | $(k_0, l_0), (k_0+4, l_0), (k_0+8, l_0)$ | 0,0,0 | 0 | 0 |
| 2 | 1 | 1, 0.5 | No CDM | $(k_0, l_0)$ | 0 | 0 | 0 |
| 3 | 2 | 1, 0.5 | FD-CDM2 | $(k_0, l_0), (k_0+2, l_0)$ | 0 | 0,1 | 0 |
| 4 | 4 | 1 | FD-CDM2 | $(k_0, l_0), (k_0, l_0+1)$ | 0,1 | 0,1 | 0 |
| 5 | 4 | 1 | FD-CDM2 | $(k_0, l_0), (k_1, l_0), (k_2, l_0), (k_3, l_0)$ | 0,1 | 0,1 | 0 |
| 6 | 8 | 1 | FD-CDM2 | $(k_0, l_0), (k_1, l_0), (k_0, l_0+1), (k_1, l_0+1)$ | 0,1,2,3 | 0,1 | 0 |
| 7 | 8 | 1 | FD-CDM2 | $(k_0, l_0), (k_1, l_0), (k_2, l_0), (k_3, l_0)$ | 0,1,2,3 | 0,1 | 0 |
| 8 | 8 | 1 | CDM4 (FD2,TD2) | $(k_0, l_0), (k_1, l_0)$ | 0,1 | 0,1 | 0,1 |
| 9 | 12 | 1 | FD-CDM2 | $(k_0, l_0), (k_1, l_0), (k_2, l_0), (k_3, l_0), (k_4, l_0), (k_5, l_0)$ | 0,1,2,3,4,5 | 0,1 | 0 |
| 10 | 12 | 1 | CDM4 (FD2,TD2) | $(k_0, l_0), (k_1, l_0), (k_2, l_0)$ | 0,1,2 | 0,1 | 0,1 |
| 11 | 16 | 1, 0.5 | FD-CDM2 | $(k_0, l_0), (k_1, l_0), (k_2, l_0), (k_3, l_0), (k_0, l_0+1), (k_1, l_0+1), (k_2, l_0+1), (k_3, l_0+1)$ | 0,1,2,3, 4,5,6,7 | 0,1 | 0 |
| 12 | 16 | 1, 0.5 | CDM4 (FD2,TD2) | $(k_0, l_0), (k_1, l_0), (k_2, l_0), (k_3, l_0)$ | 0,1,2,3 | 0,1 | 0,1 |
| 13 | 24 | 1, 0.5 | FD-CDM2 | $(k_0, l_0), (k_1, l_0), (k_2, l_0), (k_3, l_0), (k_0, l_0+1), (k_1, l_0+1), (k_2, l_0+1), (k_3, l_0+1), (k_0, l_1), (k_1, l_1), (k_2, l_1), (k_3, l_1), (k_0, l_1+1), (k_1, l_1+1), (k_2, l_1+1), (k_3, l_1+1)$ | 0,1,2,3,4,5, 6,7,8,9,10,11 | 0,1 | 0 |
| 14 | 24 | 1, 0.5 | CDM4 (FD2,TD2) | $(k_0, l_0), (k_1, l_0), (k_2, l_0), (k_3, l_0), (k_0, l_1), (k_1, l_1), (k_2, l_1), (k_3, l_1)$ | 0,1,2,3,4,5 | 0,1 | 0,1 |
| 15 | 24 | 1, 0.5 | CDM8 (FD2,TD4) | $(k_0, l_0), (k_1, l_0), (k_2, l_0)$ | 0,1,2 | 0,1 | 0,1, 2,3 |
| 16 | 32 | 1, 0.5 | FD-CDM2 | $(k_0, l_0), (k_1, l_0), (k_2, l_0), (k_3, l_0), (k_0, l_0+1), (k_1, l_0+1), (k_2, l_0+1), (k_3, l_0+1), (k_0, l_1), (k_1, l_1), (k_2, l_1), (k_3, l_1), (k_0, l_1+1), (k_1, l_1+1), (k_2, l_1+1), (k_3, l_1+1)$ | 0,1,2,3, 4,5,6,7, 8,9,10,11, 12,13,14,15 | 0,1 | 0 |
| 17 | 32 | 1, 0.5 | CDM4 (FD2,TD2) | $(k_0, l_0), (k_1, l_0), (k_2, l_0), (k_3, l_0), (k_0, l_1), (k_1, l_1), (k_2, l_1), (k_3, l_1)$ | 0,1,2,3,4,5,6,7 | 0,1 | 0,1 |
| 18 | 32 | 1, 0.5 | CDM8 (FD2,TD4) | $(k_0, l_0), (k_1, l_0), (k_2, l_0), (k_3, l_0)$ | 0,1,2,3 | 0,1 | 0,1, 2,3 |

FIG. 2A

| Index | $w_f(0)$ | $w_t(0)$ |
|---|---|---|
| 0 | 1 | 1 |

FIG. 2B

| Index | [$w_f(0)$  $w_f(1)$] | $w_t(0)$ |
|---|---|---|
| 0 | [+1  +1] | 1 |
| 1 | [+1  −1] | 1 |

FIG. 2C

| Index | [$w_f(0)$  $w_f(1)$] | [$w_t(0)$  $w_t(1)$] |
|---|---|---|
| 0 | [+1  +1] | [+1  +1] |
| 1 | [+1  −1] | [+1  +1] |
| 2 | [+1  +1] | [+1  −1] |
| 3 | [+1  −1] | [+1  −1] |

FIG. 2D

| Index | [$w_f(0)$  $w_f(1)$] | [$w_t(0)$  $w_t(1)$  $w_t(2)$  $w_t(3)$] |
|---|---|---|
| 0 | [+1  +1] | [+1  +1  +1  +1] |
| 1 | [+1  −1] | [+1  +1  +1  +1] |
| 2 | [+1  +1] | [+1  −1  +1  −1] |
| 3 | [+1  −1] | [+1  −1  +1  −1] |
| 4 | [+1  +1] | [+1  +1  −1  −1] |
| 5 | [+1  −1] | [+1  +1  −1  −1] |
| 6 | [+1  +1] | [+1  −1  −1  +1] |
| 7 | [+1  −1] | [+1  −1  −1  +1] |

| # of ports | Freq. density (RE/RB/port) | Component resource (F, T) | CDM |
|---|---|---|---|
| 1 | 1/2, 1, 3 | N/A | N/A |
| 2 | 1/2, 1 | (2, 1) | FD2 |
| 4 | 1 | (4, 1) or (2, 2) | FD2 |
| 8 | 1 | (2, 1) or (2, 2) | FD2 |
| 8 | 1 | (2, 2) | FD2TD2 |
| 12 | 1 | (2, 1) | FD2 |
| 12 | 1 | (2, 2) | FD2TD2 |
| 16 | 1/2, 1 | (2, 2) | FD2, FD2TD2 |
| 24 | 1/2, 1 | (2, 2) or (2, 4) | FD2, FD2TD2 |
| 24 | 1/2, 1 | (2, 4) | FD2TD4 |
| 32 | 1/2, 1 | (2, 2) or (2, 4) | FD2, FD2TD2 |
| 32 | 1/2, 1 | (2, 4) | FD2TD4 |

| $n$ | $w_n$ |
|---|---|
| 0 | [+1 +1 +1 +1 +1 +1 +1] |
| 1 | [+1 +1 +1 +1 −1 −1 −1] |

FIG. 5B

| $n$ | $w_n$ |
|---|---|
| 0 | [+1 +1 +1 +1 +1 +1 +1 +1 +1] |
| 1 | [+1 +1 −j −j −1 −1 +1 +1 +j +j] |
| 2 | [+1 +1 −1 −1 +1 +1 −1 −1] |
| 3 | [+1 +1 +j +j −1 −1 +j +j −j −j] |

FIG. 5C

| Orthogonal sequence index $n$ | Cyclic shift index $m_0$ | |
|---|---|---|
| | $N_{SF}^{PUCCH,4} = 2$ | $N_{SF}^{PUCCH,4} = 4$ |
| 0 | 0 | 0 |
| 1 | 6 | 6 |
| 2 | - | 3 |
| 3 | - | 9 |

| CSI-RS BANDWIDTH [RE] | THE NUMBER OF CSs |
|---|---|
| 1-23 | 12 |
| 24-47 | 24 |
| 48-59 | 36 |
| 60-71 | 48 |
| ... | ... |

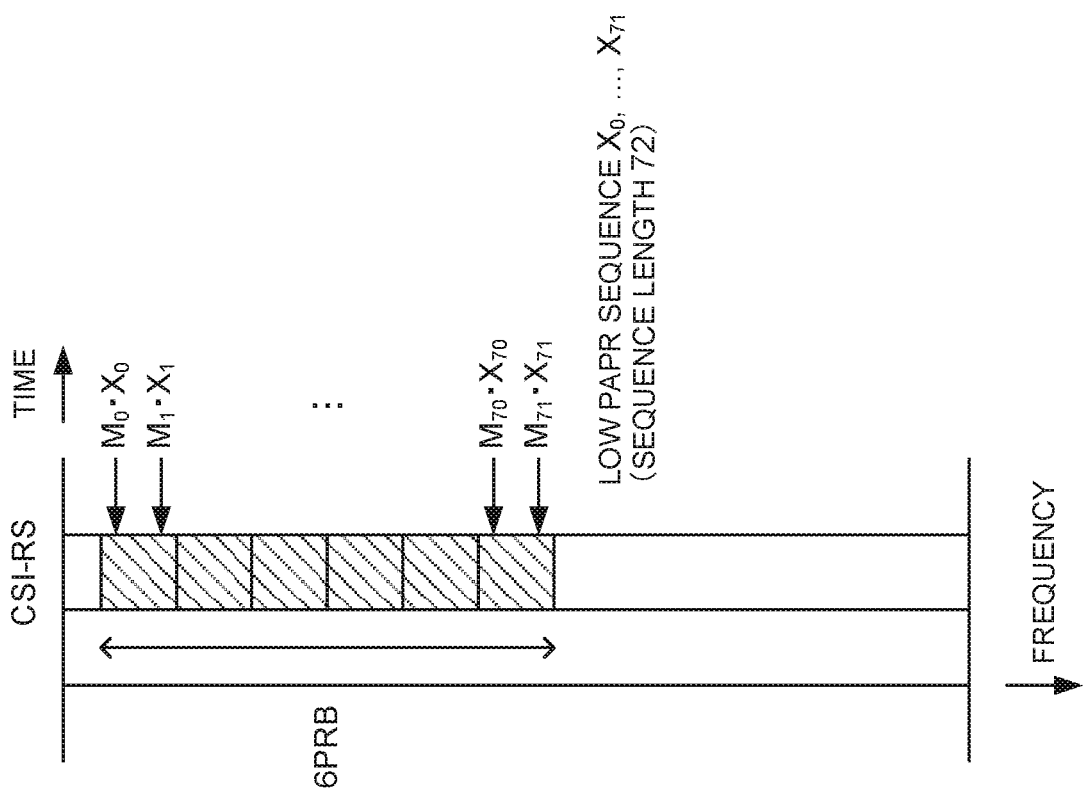

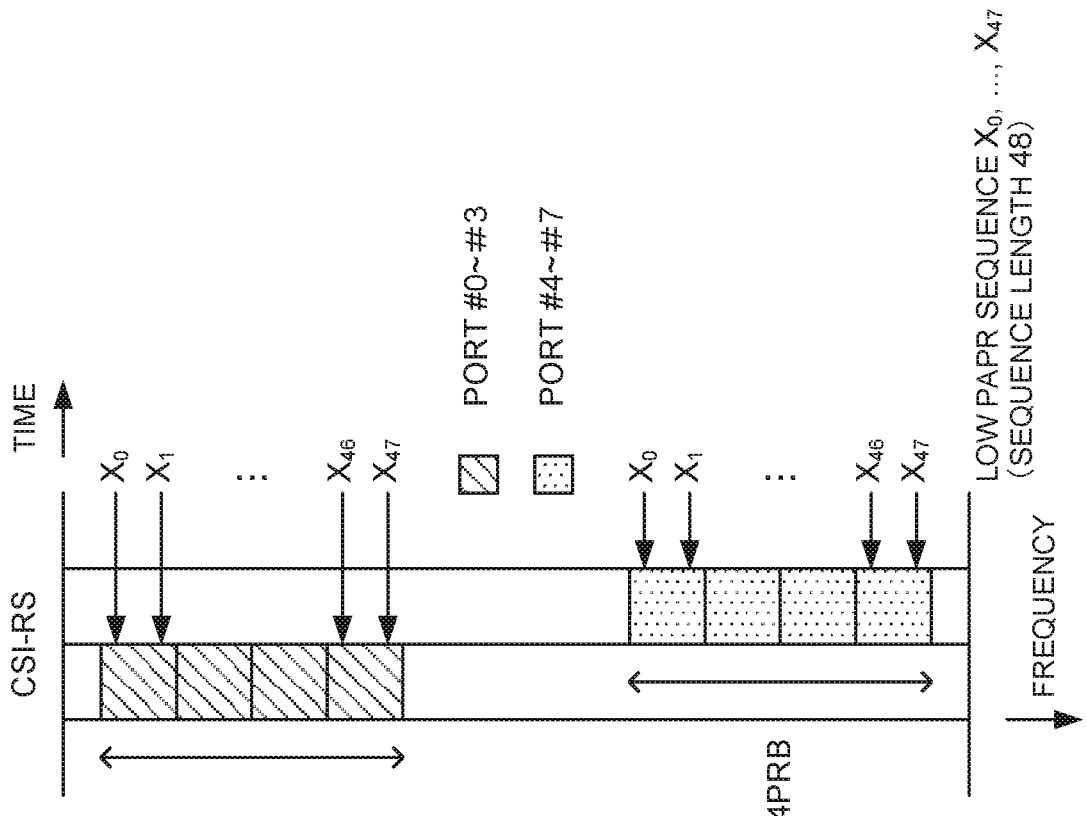
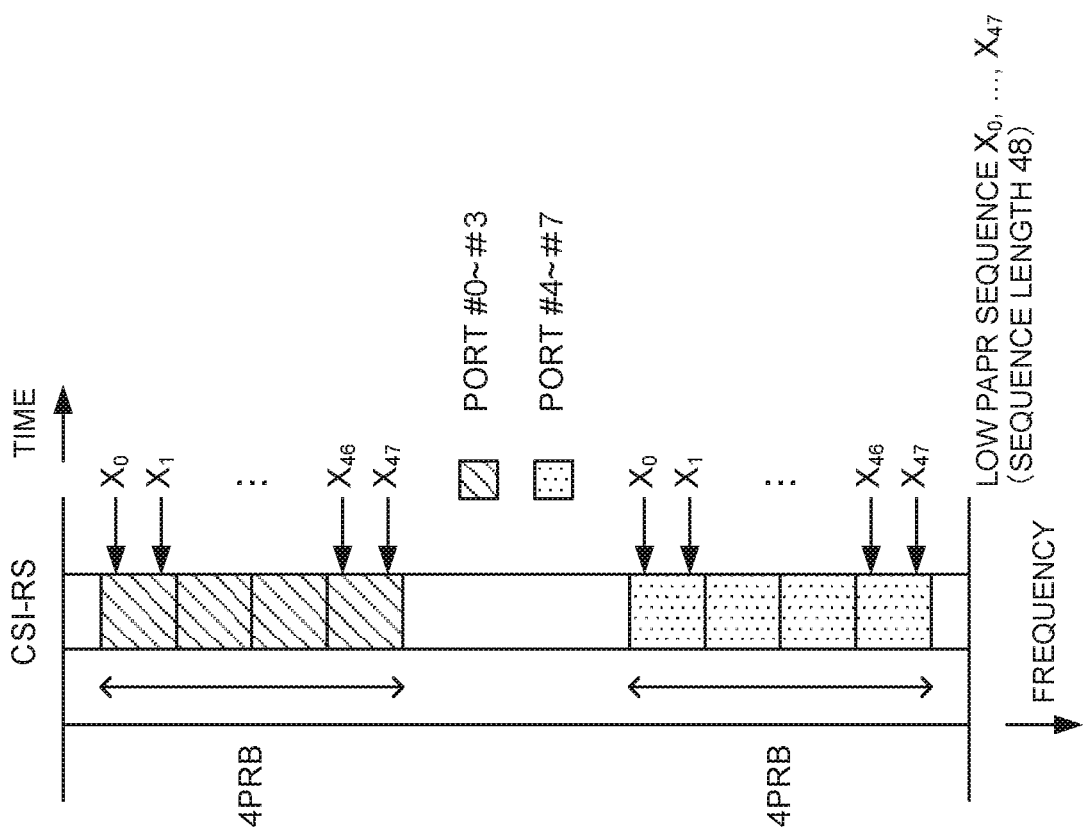

| THE NUMBER OF CSI-RS SYMBOLS | THE NUMBER OF CSs |
|---|---|
| 1-3 | 2 |
| 4-7 | 4 |
| 8-11 | 8 |
| ... | ... |

FIG. 15

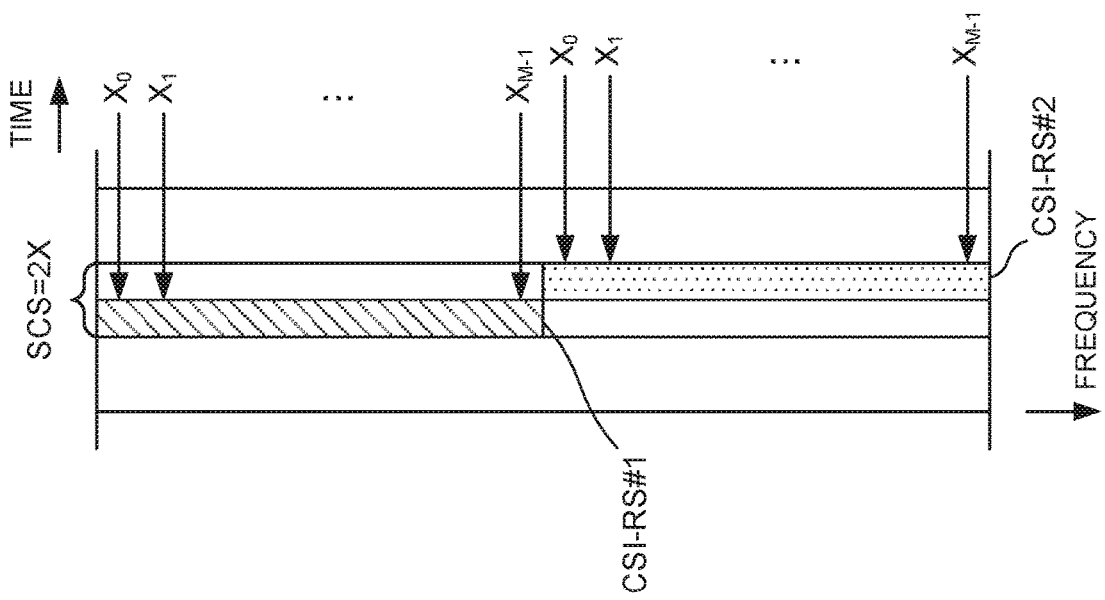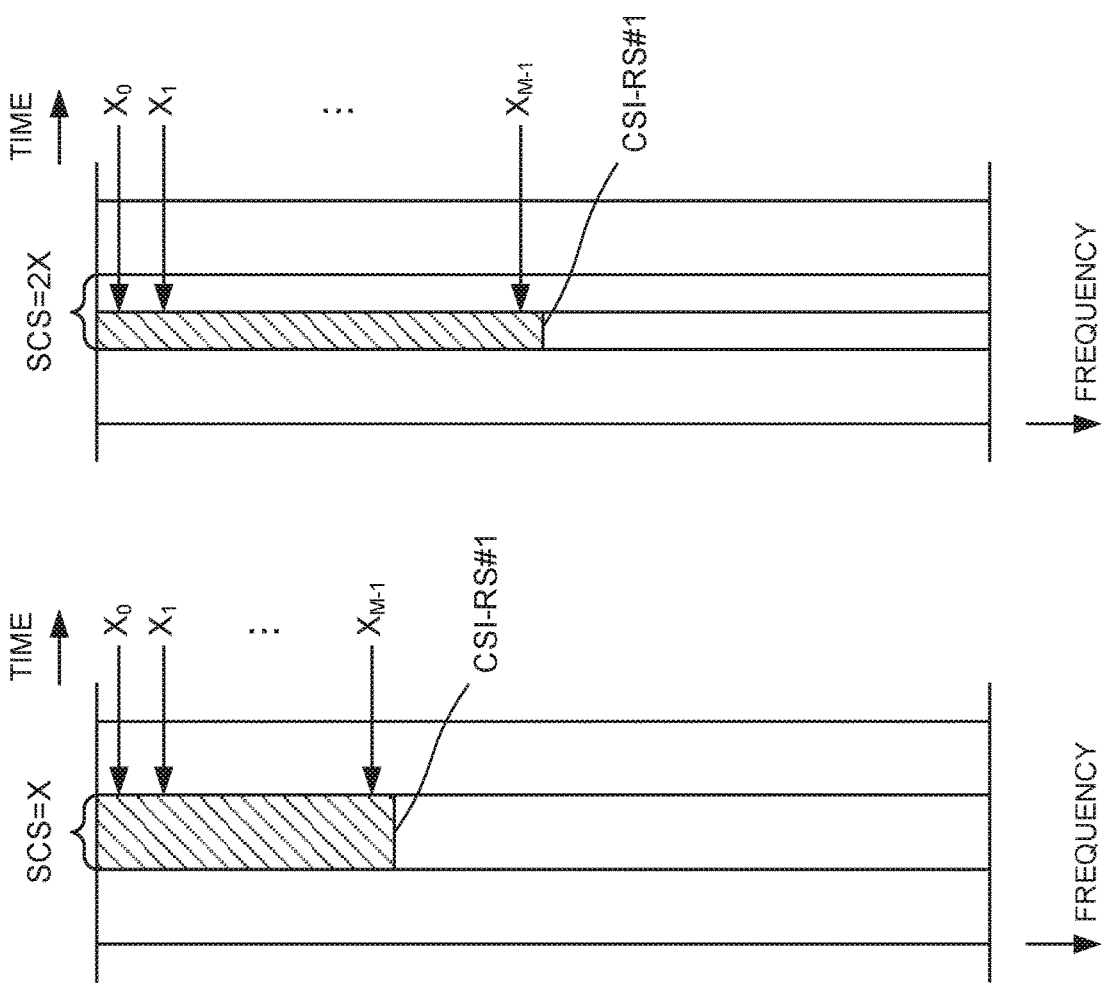

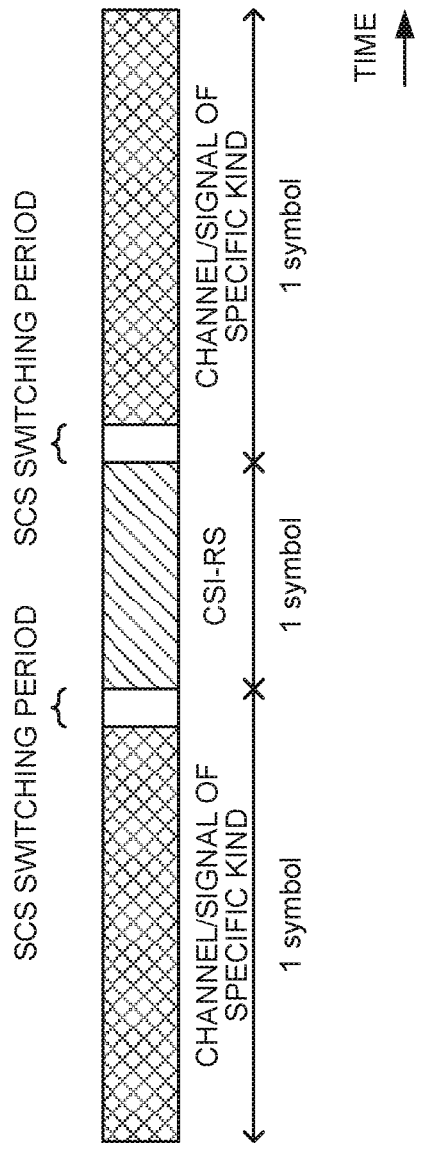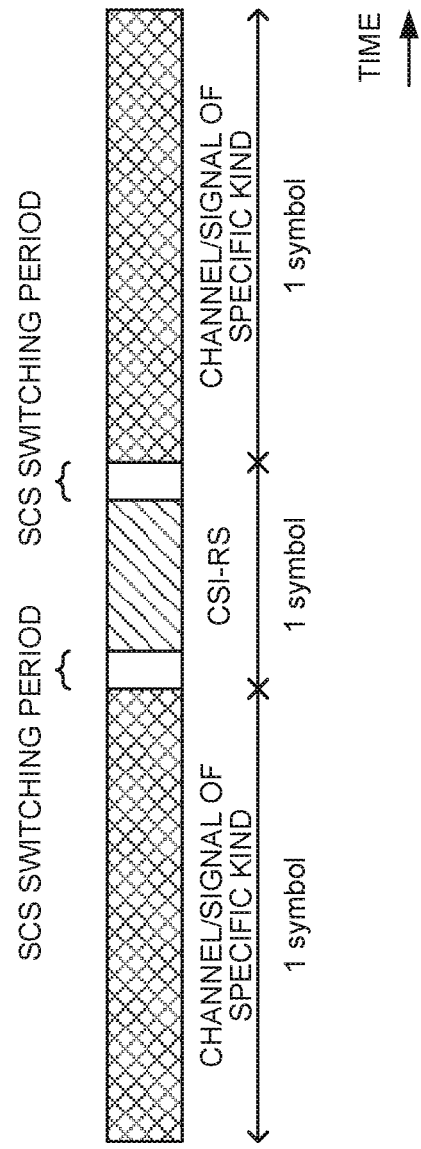

| CSI-RS SCS | SCS SWITCHING PERIOD |
|---|---|
| X | 1μs |
| 2X | 1μs |
| 3X | 2μs |
| 4X | 2μs |
| ... | ... |

FIG. 20

TERMINAL AND RADIO COMMUNICATION METHOD

TECHNICAL FIELD

The present disclosure relates to a terminal and a radio communication method in next-generation mobile communication systems.

BACKGROUND ART

In Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G))," "5G+ (plus)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR after Rel. 16), it is studied to utilize a frequency or a frequency range (FR) that is higher than a certain frequency (for example, 7.125 GHz, 24.25 GHz, 52.6 GHz, and the like).

In a frequency band which is higher than a certain frequency, it is assumed that phase noise increases and it has high sensitivity for peak-to-average power ratio (PAPR (Peak-to-Average Power Ratio)).

However, it has not been studied enough how to perform communication control (for example, design of channel/signal, modulation control or mapping control, and the like) in a frequency that is higher than a certain frequency.

Thus, an object of the present disclosure is to provide a terminal and a radio communication method which can appropriately perform communication even in case of utilizing a high frequency band.

Solution to Problem

A terminal according to an aspect of the present disclosure includes: a receiving section that receives a first channel state information (CSI)-reference signal (RS) based on a sequence having a peak-to-average power ratio (PAPR) which is lower than a PAPR of a pseudo-random sequence; and a control section that performs measurement by using the first CSI-RS.

Advantageous Effects of Invention

According to an aspect of the present disclosure, it is possible to appropriately perform communication even in a case of utilizing a high frequency band.

BRIEF DESCRIPTION OF DRAWINGS

FIG. 1 is a diagram to show an example of CSI-RS locations in a slot;

FIGS. 2A to 2D are diagrams to show an example of FD-OCC and TD-OCC;

FIG. 3 is a diagram to show an example of CSI-RS locations for each of the number of ports;

FIGS. 5A to 5C are diagrams to show an example of CDM in PUCCH format 4;

FIGS. 9A and 9B are diagrams to show an example of CSI-RS to which FD-OCC is applied;

FIGS. 10A and 10B are diagrams to show an example of CSI-RS to which FDM, or FDM and TDM are applied;

FIG. 15 is a diagram to show an example of a relationship between the number of CSI-RS symbols and the number of CSs;

FIGS. 18A to 18C are diagrams to show an example of CSI-RS to which large SCS is applied;

FIGS. 19A and 19B are diagrams to show an example of an SCS switching period;

FIG. 20 is a diagram to show an example of the relationship between the SCS and the SCS switching period;

DESCRIPTION OF EMBODIMENTS (CSI-RS)

For example, in Rel. 15, a CSI-RS is used as a DL RS for at least one of channel state information (CSI) acquisition, beam management (BM), beam failure recovery (BFR), and fine tracking of time and frequency. The CSI-RS supports 1, 2, 4, 8, 12, 16, 24, or 32 ports (antenna ports, CSI-RS ports). The CSI-RS supports periodic, semi-persistent, or aperiodic transmission. Frequency density of the CSI-RS is configurable to adjust overhead and CSI estimation accuracy.

FIG. 1 is a diagram to show an example of CSI-RS locations in a slot. Each row of the table indicates a line number, the number of ports, density of the frequency domain, a CDM type, time/frequency location (location of the component resource (k bar, 1 bar)), a code division multiplexing (CDM) group index, each resource location in the component resource ((RE, symbol), (k', l')). Here, the time/frequency location is a location of the resource (component resource) of time and frequency of a CSI-RS corresponding to one port. The k bar is the notation that an overline is added to "k". The k bar indicates a start resource element (RE) index of the component resource, and the 1 bar indicates a start symbol (OFDM symbol) index of the component resource.

CDM groups include no CDM (there is no CDM, N/A), FD-CDM2, CDM4, and CDM8. The FD-CDM2 multiplexes two ports of CSI-RS in the same time and frequency by multiplying two lengths of frequency domain (FD)-orthogonal cover code (OCC) in RE units (FD2). The CDM4 multiplexes four ports of CSI-RS in the same time and frequency by multiplying two lengths of FD-OCC and two lengths of time domain (TD)-OCC in RE units and symbol units (FD2TD2). The CDM8 multiplexes eight ports of CSI-RS in the same time and frequency by multiplying two lengths of FD-OCC and four lengths of TD-OCC in RE units and symbol units (FD2TD4).

FIGS. 2A to 2D are diagrams to show an example of FD-OCC and TD-OCC. A sequence of FD-OCC is expressed by $w_f$ (k'), and a sequence of TD-OCC is expressed by $w_t$ (k'). FIG. 2A shows a case in which the CDM type is no CDM. FIG. 2B shows a case in which the CDM type is FD-CDM2. FIG. 2C shows a case in which the CDM type is CDM4. FIG. 2D shows a case in which the CDM type is CDM8.

FIG. 3 is a diagram to show an example of CSI-RS locations for each of the number of ports based on FIG. 1. This diagram indicates the frequency density, the component resource size (size [RE] of the frequency direction, size [symbol] of the time direction), and the CDM type, for each of the number of ports.

Figure 4:
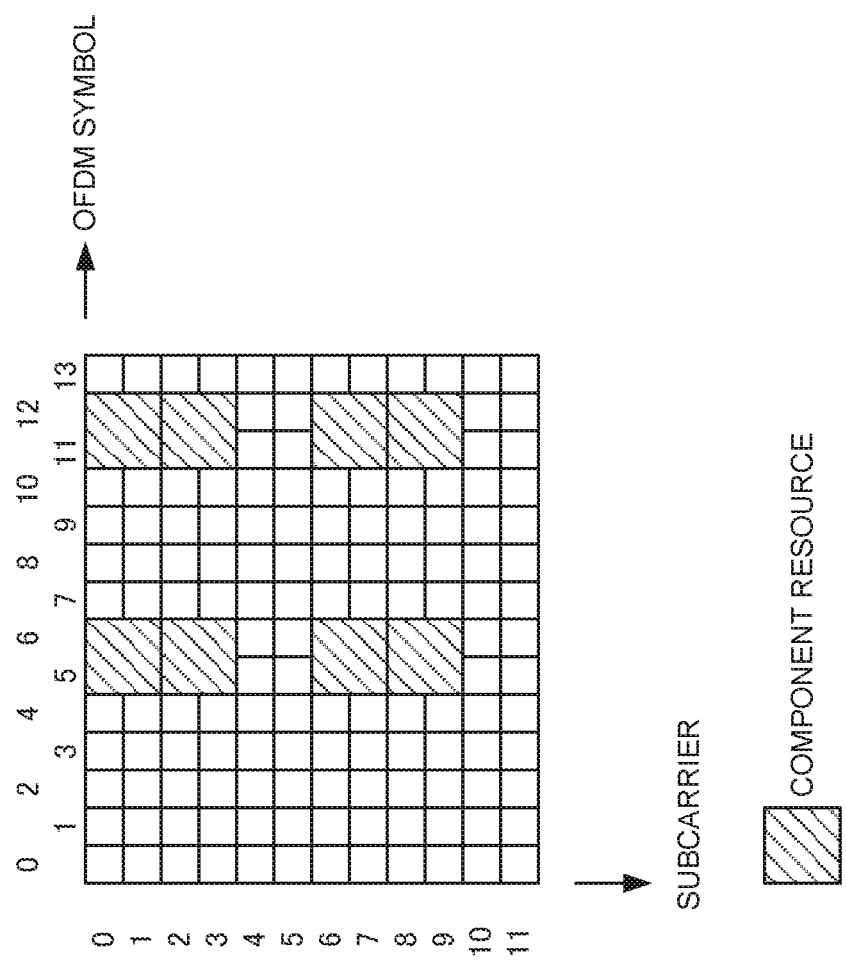
FIG. 4 is a diagram to show an example of mapping of CSI-RS of 32 ports.

For example, FIG. 4 shows an example of the resource element (RE) mapping of CSI-RS in which the number of ports is configured to 32 and the component resource size is configured to two REs*two symbols (line index 17 of FIG. 1). In the frequency domain and the time domain of one PRB*one slot, 4*2 component resources are mapped, by four of the component resource of two REs*two symbols being multiplexed (frequency division multiplexing (FDM)) in the frequency domain and two of the component resource of two REs*two symbols being multiplexed (time division multiplexing (TDM)) in the time domain. Furthermore, by two RE length of FD-OCC and two symbol length of TD-OCC being multiplied by a CSI-RS in each component resource, four CSI-RSs are multiplexed (code division multiplexing (CDM)) (CDM4, FD2TD2). Accordingly, 32 ports of CSI-RSs are transmitted in the resource of one PRB*one slot.

By the maximum number of ports of CSI-RSs 32 being greater than the maximum number of layers 8, the UE can measure many channel states and can improve measurement accuracy.

(CDM in PUCCH Format 4)

In the UL of Rel. 15 NR, PUCCH format 4 supports FD-OCC and DFT-s-OFDM (transform precoding) on the data symbol, and cyclic shift (CS, phase rotation) on the DMRS symbol.

As shown in FIGS. 5A and 5B, FD-OCC applied to data (uplink control information (UCI)) of PUCCH format 4 for each number of multiplexing (spreading factor) $N_{SF}^{PUCCH,4}$ is associated with the orthogonal sequence index. FIG. 5A shows a case in which the number of multiplexing is two. FIG. 5B shows a case in which the number of multiplexing is four. By multiplying FD-OCC of the number of multiplexing by data of PUCCH format 4, data to the number of multiplexing is multiplexed by CDM.

As shown in FIG. 5C, a CS index applied to DMRS of PUCCH format 4 is associated with the orthogonal sequence index. By applying CS based on the CS index to the DMRS of PUCCH format 4, the DMRS is multiplexed by CDM.

(FR)

In NR, it has been studied to utilize frequency bands up to 52.6 GHz. In NR after Rel. 16, it is studied to utilize frequency bands above 52.6 GHz. Note that the frequency bands may be expressed in other words with frequency ranges (FRs) appropriately.

Figure 6:
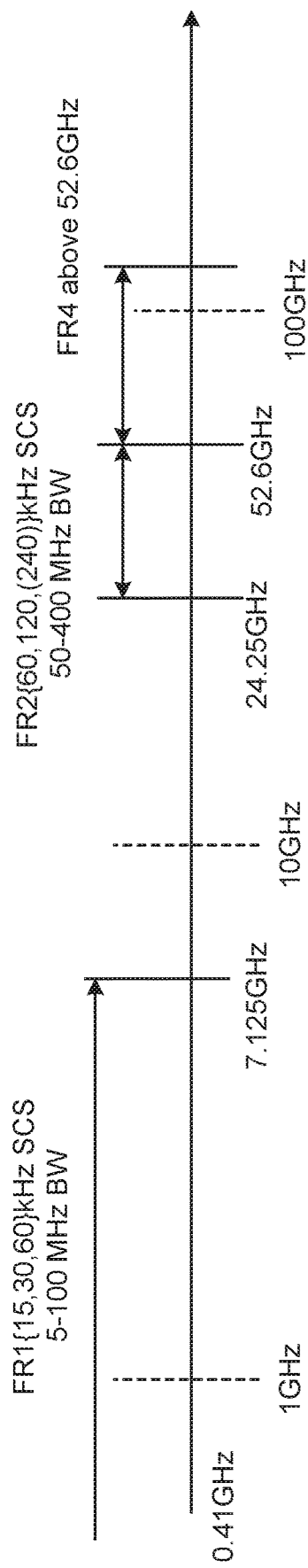
FIG. 6 is a diagram to show an example of FR.

FIG. 6 is a diagram to show an example of FR. FR4 is, for example, from 52.6 GHz to 114.25 GHz. Note that, as frequency ranges in existing Rel-15 NR, FR1 corresponds to 410 MHz to 7.152 GHz, and FR2 corresponds to 24.25 GHz to 52.6 GHz. FR3 is, for example, from 7.152 GHz to 24.25 GHz. FR4 may be referred to as FRx (x is arbitrary character string).

In the frequency bands higher than 52.6 GHz, it is assumed that phase noise increases, and propagation loss increases. A problem is also assumed that the frequency bands higher than 52.6 GHz have high sensitivity for nonlinearity of peak-to-average power ratio (PAPR (Peak-to-Average Power Ratio)) and Power Amplifier (PA).

Thus, at least one of large (wide) subcarrier spacing (SCS) (in other words, little FFT point sizes), single carrier waveform, a mechanism of PAPR reduction in large SCS, narrow beam (in other words, a large number of beams) is required.

In consideration with the above-mentioned matters, in the frequency bands higher than 52.6 GHz (or waveform for above 52.6 GHz), it is considered to use CP-OFDM and DFT-S-OFDM in which subcarrier spacing is wider than Rel-15 NR, and the like.

The large SCS causes at least one of short symbol lengths, short cyclic prefix (CP) lengths, and short slot lengths. For the maximization of coverage and power amplification efficiency, DL control channel structure of low PAPR is preferable.

In Rel. 15, DL channels (for example, PDCCH, and the like) are designed based on OFDM waveform, but it is also assumed in the frequency bands higher than 52.6 GHz that channel design based on single carrier be studied.

It is not clear how a base station transmits a CSI-RS in a high frequency band. For example, it is not clear how to support a plurality of antenna ports of CSI-RS. If CSI-RS is not transmitted appropriately in a high frequency, it might cause degradation of the system performance.

Thus, the inventors of the present invention came up with the idea of a structure, a control method, and the like of CSI-RS in a high frequency.

Embodiments according to the present disclosure will be described in detail with reference to the drawings as follows. The radio communication method according to each embodiment may be employed independently or may be employed in combination of at least two of embodiments.

In the present disclosure, antenna ports and CSI-RS ports may be interchangeably interpreted. In the present disclosure, DFT-s-OFDM and transform precoding may be interchangeably interpreted.

In the present disclosure, beam, quasi co-location (QCL) assumption, QCL relationship, transmission configuration indicator (TCI) state, spatial domain filter spatial domain receive filter, reference signal (RS), SS/PBCH block (SSB), and CSI-RS may be interchangeably interpreted.

In the present disclosure, a channel/signal may be interpreted as at least one of a channel and a signal.

Each embodiment may be applied to a frequency that is higher than a certain frequency (for example, 7.125 GHz, 24.25 GHz, 52.6 GHz, and the like). Note that each embodiment can also be applied to not only FR4 (for example, a certain frequency range that is higher than 52.6 GHz) but also other FR (for example, FR1, FR2, FR3, and the like). FRx (x is an arbitrary alphanumeric character) of the present disclosure may be interpreted as arbitrary FRx.

(Radio Communication Method)

First Embodiment

<<CSI-RS Sequence>>

The CSI-RS sequence may be defined by low-Peak to Average Power Ratio (low PAPR) sequence. The UE may assume that CSI-RS sequence is defined by low PAPR sequence.

The low PAPR sequence may be Constant Amplitude Zero Auto Correlation (CAZAC) sequence, or may be a sequence (for example, computer-generated sequence (CGS)) in accordance with CAZAC sequence. The CGS may be prescribed by a specification (for example, a table).

In a case where the CSI-RS sequence length is smaller than M, the CSI-RS sequence may be a CGS, and in a case where the CSI-RS sequence length is greater than or equal to M, the CSI-RS sequence may be a CAZAC sequence (for example, Zadoff-Chu sequence). For example, M may be 30. The length of the CAZAC sequence may be a prime number or may be prime number−1.

By using low PAPR sequence for CSI-RS, it is possible to reduce cross-correlation and reduce inter-cell interference. By lengthening the low PAPR sequence length, it is possible to further reduce cross-correlation.

DFT-s-OFDM may be applied to CSI-RS. The CSI-RS sequence may be a Pseudo-Random sequence (Pseudo-Noise (PN) sequence, for example, Gold sequence, 31 length of Gold sequence, and M sequence). An initial value $c_{init}$ used for the generation of the pseudo-random sequence may be based on at least one of higher layer signaling and cell ID. The CSI-RS sequence may be an all one sequence.

At least one of offset quadrature phase shift keying (OQPSK), π/2 shift binary phase shift keying (BPSK), and DFT-s-OFDM may be applied to CSI-RS.

Even in a case of using a sequence other than a low PAPR sequence for the CSI-RS sequence, by applying DFT-s-OFDM (transform precoding enabled), the PAPR can be lowered compared to a case of applying CP-OFDM (transform precoding disabled).

<<Plurality of Antenna Ports>>

A plurality of antenna ports may be supported to CSI-RS. An antenna port (CSI-RS port) may be associated with at least one of the following resources 1 to 6.

—Resource 1: CS (Index)

By the plurality of antenna ports being associated with different CSs, CSI-RSs of the plurality of antenna ports are multiplexed by CDM in the same time/frequency resources (for example, component resources).

—Resource 2: FD-OCC (Index)

By the plurality of antenna ports being associated with different FD-OCCs, CSI-RSs of the plurality of antenna ports are multiplexed by CDM in the same time/frequency resources.

—Resource 3: TD-OCC (Index)

By the plurality of antenna ports being associated with different TD-OCCs, CSI-RSs of the plurality of antenna ports are multiplexed by CDM in the same time/frequency resources.

—Resource 4: Frequency resource (RE index)

By the plurality of antenna ports being associated with different frequency resources, CSI-RSs of the plurality of antenna ports are multiplexed by FDM.

—Resource 5: Time Resource (Symbol Index)

By the plurality of antenna ports being associated with different time resources, CSI-RSs of the plurality of antenna ports are multiplexed by TDM. In a case where one CSI-RS is transmitted on a plurality of symbols, CSI-RSs of the plurality of antenna ports may be multiplexed by TDM.

—Resource 6: Spread Code (Code Index)

By the plurality of antenna ports being associated with different spread codes, CSI-RSs of the plurality of antenna ports are multiplexed by CDM in the same time/frequency resources.

The association (mapping) of an antenna port index and at least one of the resources 1 to 6 may be configured by higher layer signaling, or may be prescribed by a specification. By combining the resources 1 to 6, it is possible to further increase the number of antenna ports.

The plurality of antenna ports may correspond to different layers (multiple input multiple output (MIMO) layer) or may correspond to different UEs. The number of antenna ports may be greater than the number of layers, may be greater than the number of UEs, or may be greater than the number of layers*the number of UEs. A plurality of layers may correspond different antenna ports. A plurality of UEs may correspond different antenna ports.

A CSI-RS resource including at least one of the resources 1 to 6 may be associated with at least one of an antenna port and a group of antenna ports (antenna port group).

Specific Example of Resource 1

Figure 7B:
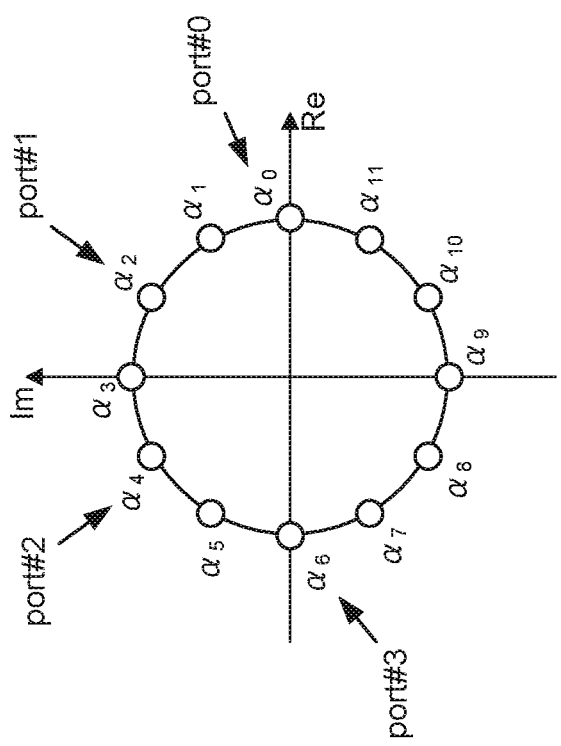
FIGS. 7A and 7B are diagrams to show an example of CSI-RS to which CS is applied.
Figure 7A:
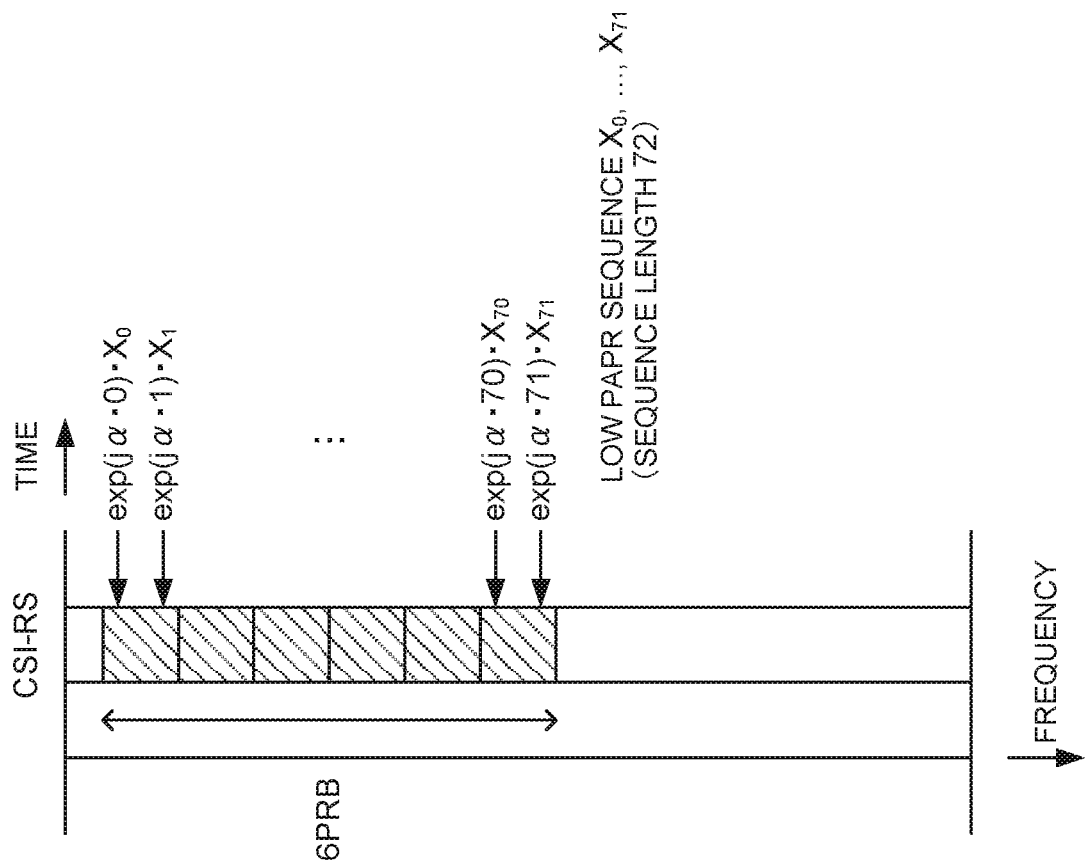

A plurality of antenna ports may be associated with different CSs. For example, as shown in FIG. 7A, suppose the CSI-RS sequence length is 72, and the CSI-RS sequence is $[X_0, X_1, \ldots, X_{71}]$. $\alpha$ which is CS may be based on a CS index. As shown in FIG. 7B, the ports #0, #1, #2, and #3 may be associated with the CS indices 0, 2, 4, and 6 (CS $\alpha_0$, $\alpha_2$, $\alpha_4$, and $\alpha_6$), respectively. DFT-s-OFDM may be applied to a CSI-RS sequence to which cyclic shift is applied.

The number of CSs associated with the plurality of antenna ports (the number of CSs to support the plurality of antenna ports of CSI-RS) may be constant. For example, the number of CSs associated with the plurality of antenna ports may be the number of REs per PRB (for example, 12). In this case, it is possible to improve the orthogonality and quality.

The number of CSs associated with the plurality of antenna ports may be the same as the overall sequence length (for example, CSI-RS bandwidth, the number of REs used for CSI-RS (the number of PRBs used for the number of REs*CSI-RS per PRB)). In this case, it is possible to improve the multiplexing capacity.

Figures 8A, 8B:
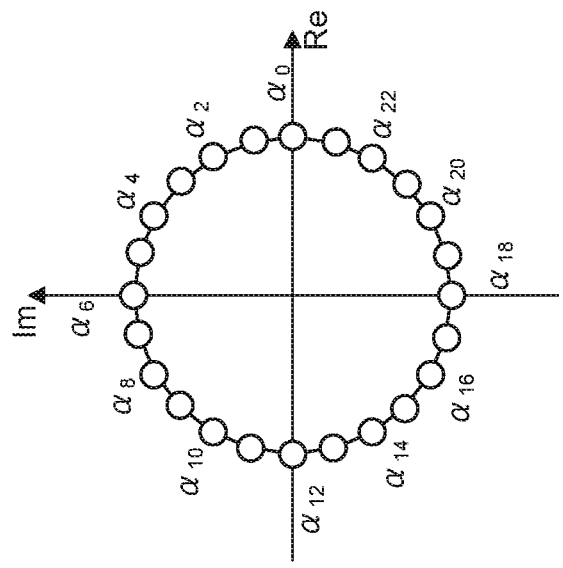
FIGS. 8A and 8B are diagrams to show an example of a relationship between the CSI-RS bandwidth and the number of CSs.
Figure 24:
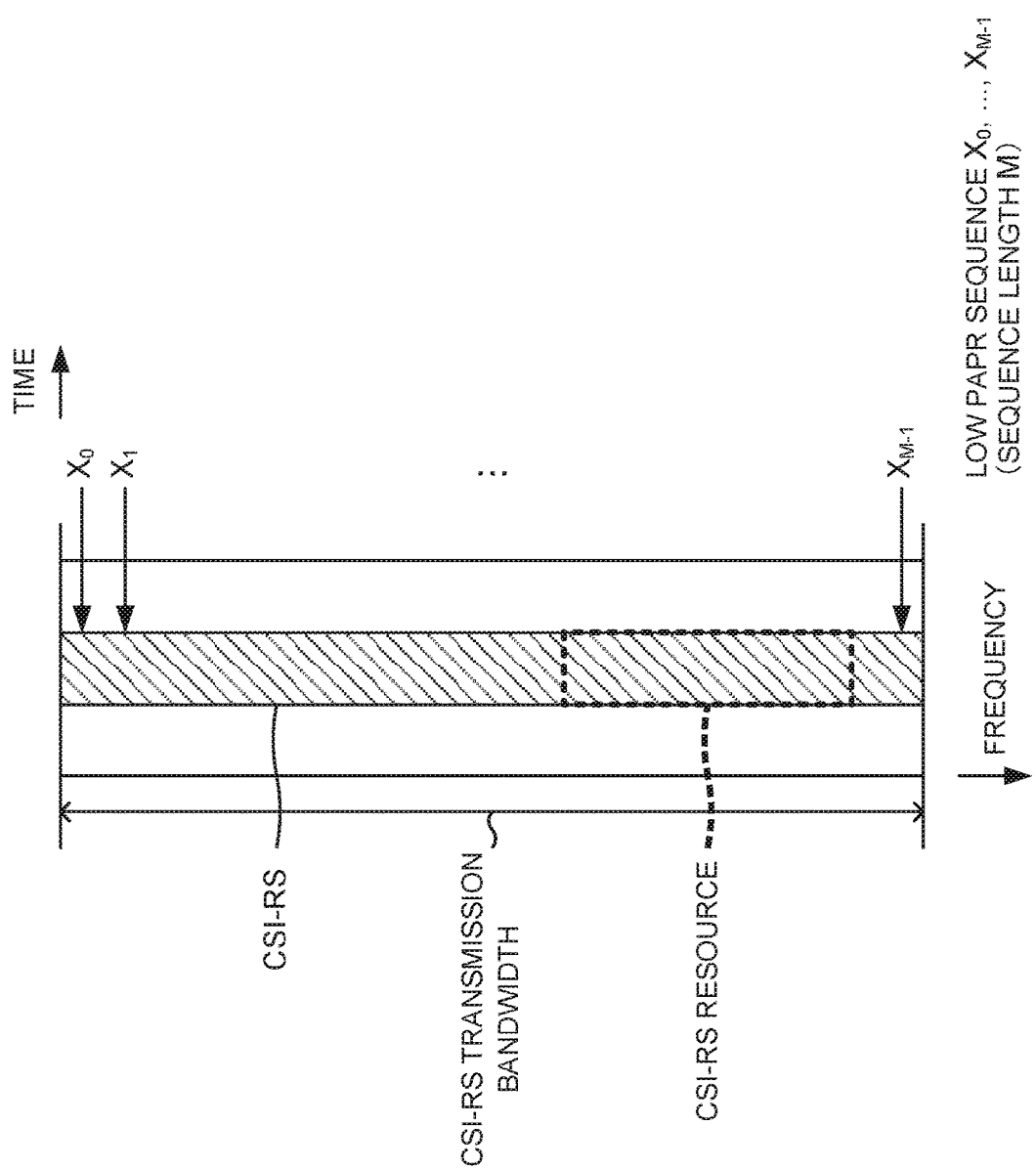
FIG. 24 is a diagram to show an example of the relationship between the CSI-RS transmission band and the CSI-RS resource.

The number of CSs associated with the plurality of antenna ports may depend on the CSI-RS bandwidth (for example, the number of PRBs or the number of REs used for CSI-RS). As shown in FIG. 8A, the association (for example, a table) of the CSI-RS bandwidth (CSI-RS sequence length) and the number of CSs associated with the plurality of antenna ports may be prescribed by a specification, or may be configured or updated by higher layer signaling. For example, in a case where the CSI-RS bandwidth is 24 to 57 REs, as shown in FIG. 8B, 24 CSs may be associated with different antenna ports. In this case, it is possible to improve the orthogonality and quality. In a case in which the CSI-RS bandwidth is wide, it is possible to improve the multiplexing capacity.

By enlarging the CSI-RS bandwidth, it is possible to increase the number of CSs and the number of antenna ports, and it is possible to measure a wide band of channels.

Specific Example of Resource 2

A plurality of antenna ports may be associated with different FD-OCCs. The FD-OCC length may be equal to the CSI-RS sequence length.

For example, as shown in FIG. 9A, suppose the CSI-RS sequence length and the FD-OCC length are 72, the CSI-RS sequence is $[X_0, X_1, \ldots, X_{71}]$, and the FD-OCCs are $[M_0, M_1, \ldots, M_{71}]$. The FD-OCCs may be multiplied to the CSI-RS sequence in RE units. By different FD-OCCs being multiplied to the CSI-RSs of the plurality of antenna ports, those CSI-RSs may be multiplexed by CDM.

As shown in FIG. 9B, the association (for example, a table) of FD-OCC indices and FD-OCCs may be prescribed by a specification, or may be configured or updated by higher layer signaling.

DFT-s-OFDM may be applied to the CSI-RS sequence multiplied by FD-OCC for each RE.

The association (for example, a table) of FD-OCC indices and FD-OCCs may be prescribed by a specification for each parameter about the CSI-RS sequence length, the CSI-RS bandwidth, or the FD-OCC length. For example, a table for each CSI-RS bandwidth (for example, four PRBs, six PRBs, ten PRBs, and the like) may be prescribed by a specification. The UE may determine which table is used based on a parameter configured by higher layer signaling.

Specific Example of Resource 4/5

A plurality of antenna ports may be associated with at least one of different frequency resources and different time resources. CSI-RSs corresponding to a plurality of antenna ports or a group of a plurality of antenna ports may be multiplexed by at least one of FDM and TDM.

Figure 11:
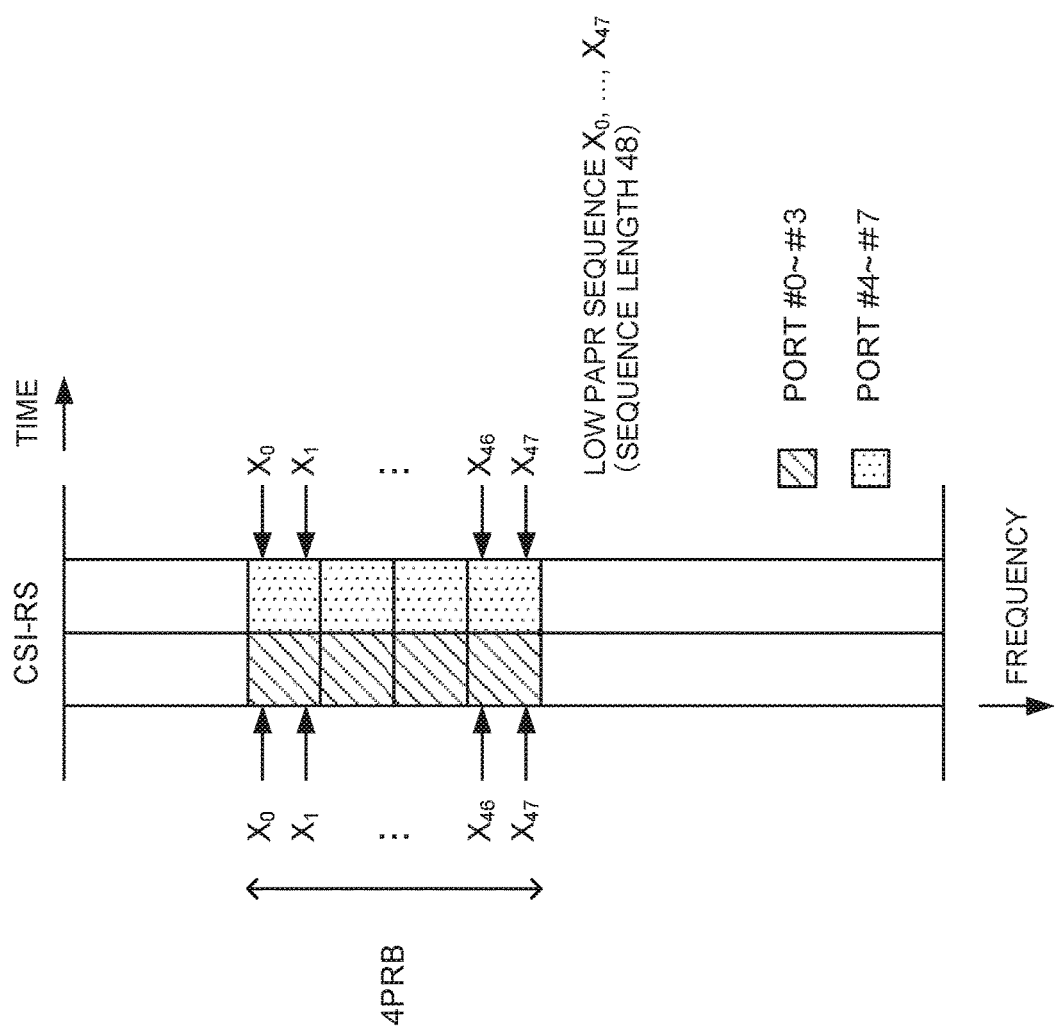
FIG. 11 is a diagram to show an example of CSI-RS to which TDM is applied.

In examples of FIGS. 10A, 10B, and 11, CSI-RSs of ports #0 to #3 may be multiplexed by CDM in one time and frequency resource by using different CSs. CSI-RSs of ports #4 to #7 may be multiplexed by CDM in another time and frequency resource by using different CSs.

CSI-RSs corresponding to a plurality of antenna ports may be multiplexed by FDM. For example, as shown in FIG. 10A, CSI-RSs of ports #0 to #3 and CSI-RSs of ports #4 to #7 may be multiplexed by FDM.

CSI-RSs corresponding to a plurality of antenna ports may be multiplexed by FDM and TDM. For example, as shown in FIG. 10B, CSI-RSs of ports #0 to #3 and CSI-RSs of ports #4 to #7 may be multiplexed by FDM and TDM. CSI-RSs of ports #0 to #3 and CSI-RSs of ports #4 to #7 may not be mapped to contiguous symbols.

CSI-RSs corresponding to a plurality of antenna ports may be multiplexed by TDM. For example, as shown in FIG. 11, CSI-RSs of ports #0 to #3 and CSI-RSs of ports #4 to #7 may be multiplexed by TDM. CSI-RSs of ports #0 to #3 and CSI-RSs of ports #4 to #7 may not be mapped to contiguous symbols.

Specific Example of Resource 3

A plurality of antenna ports may be associated with different TD-OCCs. The TD-OCC length may be equal to the number of CSI-RS symbols.

Figure 12:
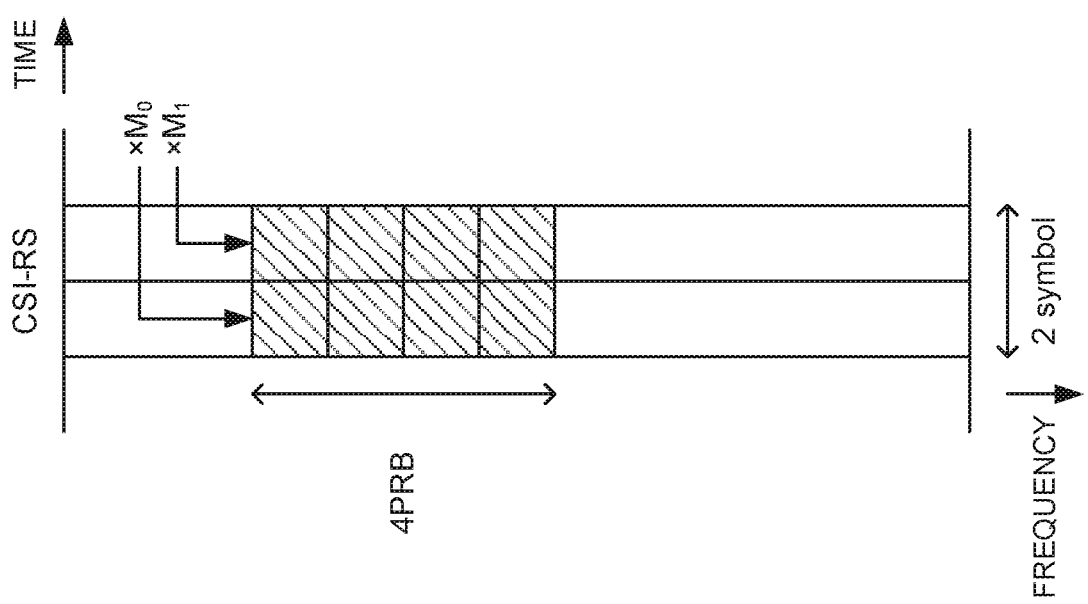
FIGS. 12A and 12B are diagrams to show an example of CSI-RS to which TD-OCC is applied.

For example, as shown in FIG. 12A, suppose the number of CSI-RS symbols and the TD-OCC length are 2, and TD-OCCs are $[M_0, M_1]$. The TD-OCCs may be multiplied to the CSI-RS in symbol units. The CSI-RS sequence of each symbol may be the same or may be different. By different TD-OCCs being multiplied to the CSI-RSs of the plurality of antenna ports, those CSI-RSs may be multiplexed by CDM.

As shown in FIG. 12B, the association (for example, a table) of TD-OCC indices and TD-OCCs may be prescribed by a specification, or may be configured or updated by higher layer signaling.

The CSI-RSs and the TD-OCCs may be mapped to consecutive symbols. In this case, the TD-OCC length may be equal to the CSI-RS time length (the number of symbols). The CSI-RSs and the TD-OCCs may be mapped to non-contiguous symbols. In this case, the TD-OCC length may be equal to the number of CSI-RS symbols.

The CSI-RSs associated with each port may be a low PAPR sequence having a sequence length corresponding to the bandwidth (the number of REs).

DFT-s-OFDM may be applied to the CSI-RS sequence multiplied by TD-OCC for each symbol.

The association (for example, a table) of TD-OCC indices and TD-OCCs may be prescribed by a specification for each parameter about the TD-OCC length (the number of symbols) or the number of CSI-RS symbols (time length). For example, a table for each number of CSI-RS symbols may be prescribed by a specification. The UE may determine which table is used based on a parameter configured by higher layer signaling.

Because the symbol length decreases by expansion of the SCS, it is preferable for TD-OCC to support a plurality of antenna ports of CSI-RS.

Figure 13:
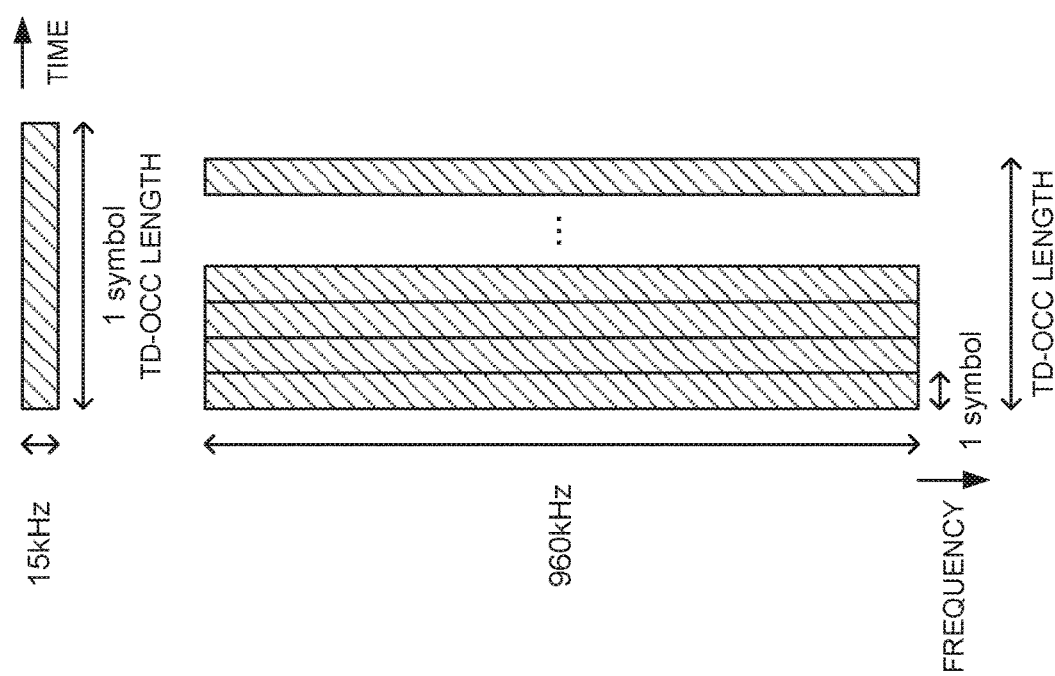
FIG. 13 is a diagram to show an example of a relationship between the SCS and the TD-OCC length.

A plurality of TD-OCC lengths associated with a plurality of SCSs (for example, 2, 4, 8, 12, 16, . . . , and the like) may be prescribed by a specification. For example, as shown in FIG. 13, one (no CDM) TD-OCC length may be associated with SCS of 15 kHz, and more than one TD-OCC lengths may be associated with SCS of 960 kHz. The UE may select a TD-OCC length depending on the configured CSI-RS resource (for example, at least one of SCS of CSI-RS, the number of symbols (time length) of CSI-RS).

Because the fluctuation of signals by movement becomes small when the SCS increases and the symbol length shortens, the orthogonality of TD-OCC can be maintained even if the number of symbols of CSI-RS and the TD-OCC length increases.

[Variation of Resource 1]

CS may be applied to the time domain.

In a case where sequence hopping of symbol level (per symbol) is applied to a CSI-RS sequence, the same sequence (for example, base sequence) may be applied to all symbols to which CS is applied (sequence hopping may be stopped for all symbols to which CS is applied). For example, the sequence of all symbols to which CS is applied may follow the sequence of the first symbol. All symbols to which CS is applied may be all symbols of CSI-RS or may be part of symbols of CSI-RS.

Figure 14:
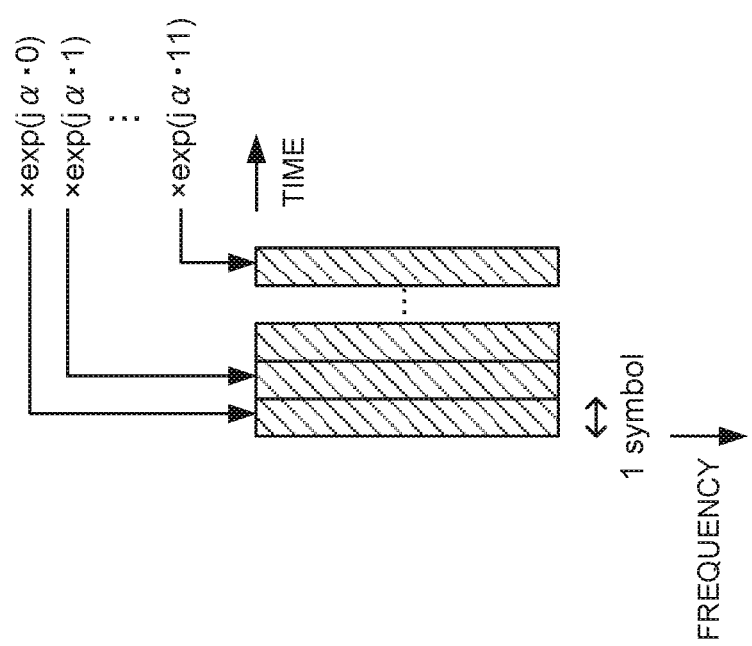
FIG. 14 is a diagram to show an example of CSI-RS to which CS in the time domain is applied.

For example, as shown in FIG. 14, a, which is one of 12 CSs shown in FIG. 7B, may be applied to the CSI-RS for 12 symbols. In other words, similarly to multiplication of TD-OCC, a sequence [exp (j$\alpha$*0), exp (j$\alpha$*1), . . . , exp (j$\alpha$*11)] (orthogonal sequence based on $\alpha$) indicating CS may be multiplied to the CSI-RS of 12 symbols in symbol units.

The UE may be configured a CSI-RS resource including a CS index to determine CS ($\alpha$) by higher layer signaling.

The CSI-RS may be mapped to a plurality of contiguous symbols, or may be mapped to a plurality of non-contiguous symbols.

The number of CSs associated with the plurality of antenna ports (the number of CSs to support the plurality of antenna ports of CSI-RS) may be constant (for example, 2, 4, 8, and the like). In this case, it is possible to improve the orthogonality and quality.

The number of CSs associated with the plurality of antenna ports may be the same as the number of symbols of the entire CSI-RS (time length). In this case, it is possible to improve the multiplexing capacity.

The number of CSs associated with the plurality of antenna ports may depend on the number of CSI-RS symbols (time length). As shown in FIG. 15, the association (for example, a table) of the number of CSI-RS symbols and the number of CSs associated with the plurality of antenna ports may be prescribed by a specification, or may be configured or updated by higher layer signaling. In this case, it is possible to improve the orthogonality and quality. As the number of CSI-RS symbols increases, it is possible to improve the multiplexing capacity.

Specific Example of Resource 6

Figure 16:
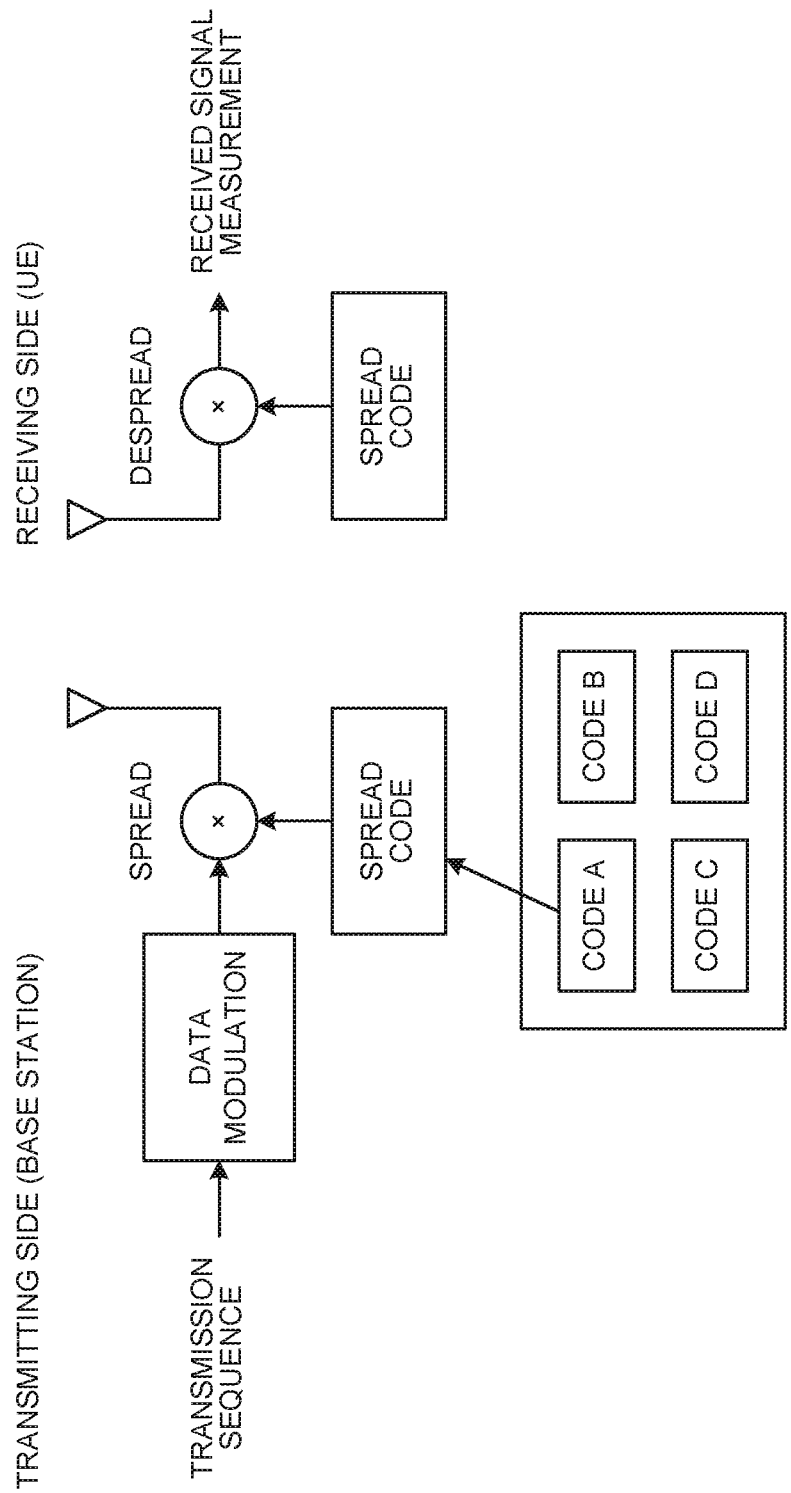
FIG. 16 is a diagram to show an example of a structure to apply a spread code to CSI-RS.

A plurality of antenna ports may be associated with different spread codes. For example, as shown in FIG. 16, a base station may select one spread code from a spread code set (for example, codes A, B, C, and D) and notify the UE of the selected spread code (for example, code A). The base station transmits a signal obtained by spreading the CSI-RS by using the spread code (multiplying the spread code to the CSI-RS). The UE may receive signals corresponding to a plurality of spread codes and measure the CSI-RS obtained by despreading the received signals by using the notified spread code (multiplying the same spread code as CSI-RS to the received signal). The base station and the UE may multiply a spread code for each time which is shorter than a symbol. The UE may be notified of one of a plurality of candidates (spread code set) of spread codes, or may generate a spread code based on a UE-specific parameter (for example, UE index).

Figure 17:
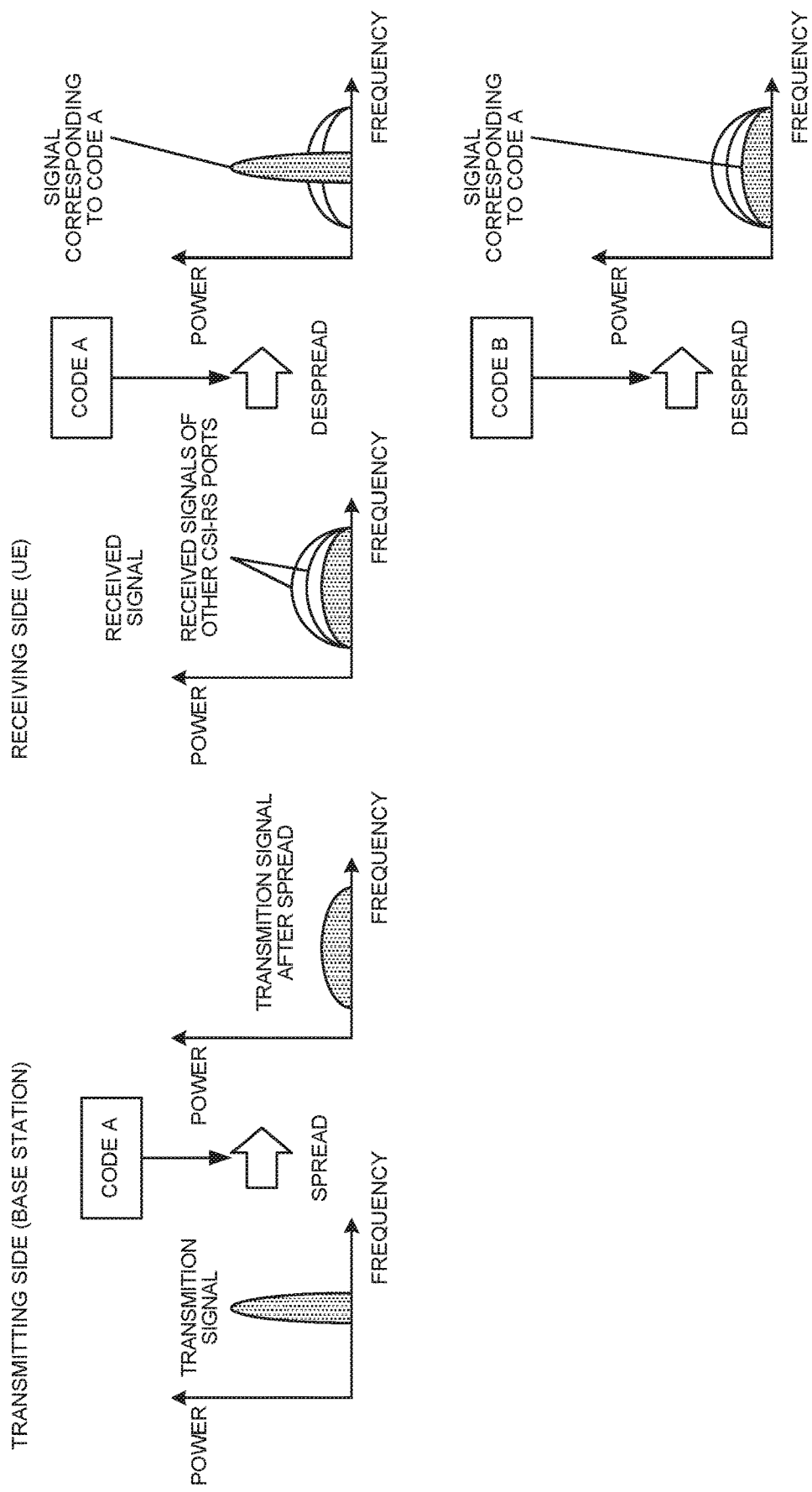
FIG. 17 is a diagram to show an example of spectrum of CSI-RS to which a spread code is applied.

As shown in FIG. 17, by the UE performing despreading by using the spread code same as the spread code applied by the base station, the power spectral density of the CSI-RS corresponding to the spread code increases, so the UE can measure the CSI-RS. The UE can consider the received signals to which spread codes are applied except the spread code applied to the UE to be noise.

The spread code may be a PN sequence, may be an orthogonal variable spreading factor (OVSF) code, or may be a code having {0, 1} or {−1, 1} as an element.

<<SCS>>

The CSI-RS may have an SCS which is m times larger than a channel/signal of a specific type. For example, a channel/signal of a specific type may be at least one of PDSCH, PDCCH, DMRS of PDSCH, or DMRS of PDCCH. m may be $2^n$. m or n may be configured by higher layer signaling, or may be prescribed by a specification.

For example, as shown in FIGS. 18A and 18B, by increasing the SCS from X to 2X, the symbol length shortens, and it is possible to shorten the time of CSI-RS.

For example, as shown in FIG. 18C, in a case where the SCS is 2X, by performing TDM on one CSI-RS #1, #2, it is possible to apply different beams to the CSI-RS #1 and the CSI-RS #2 within a limited time. For example, different beams may be applied to the CSI-RS #1 and the CSI-RS #2 depending on time by using analog beam forming. The CSI-RS #1 and the CSI-RS #2 may have different QCL type D relation (may be associated with different beams (RSs)). The UE can measure two beams within a time corresponding to one symbol of channel/signal of a specific type. By increasing the SCS of CSI-RS, even in a case where the number of beams increases, it is possible to suppress the time of CSI-RS.

By increasing the SCS of CSI-RS, and enlarging the band of CSI-RS, the UE can measure larger bands.

During switching of SCS, the UE may not be required to perform at least one of transmission, reception, decoding, and monitor of a channel/signal.

As shown in FIG. 19A, the SCS switching period may be within a period of the channel/signal of the specific type. In this case, it is possible to keep the measurement accuracy of the CSI-RS.

As shown in FIG. 19B, the SCS switching period may be within a period of a CSI-RS. In this case, it is possible to keep the quality of the channel/signal of the specific type.

As shown in FIG. 20, the association (for example, a table) of the SCS of a CSI-RS or the SCS of a channel/signal of a specific type and the SCS switching time length may be prescribed by a specification, or may be determined by the UE based on higher layer signaling or the UE capability. A table indicating the association of the SCS of a CSI-RS or the SCS of a channel/signal of a specific type and the SCS switching time length may be prescribed by a specification for each parameter of at least one of higher layer signaling and the UE capability. The UE may select one of a plurality of tables based on at least one of higher layer signaling and the UE capability.

In a case where switching (change) of the SCS is configured (indicated), the UE may expect that a channel/signal is not scheduled during a specific time length of period before or after the CSI-RS. The specific time length may be the SCS switching time length.

<<Comb>>

A CSI-RS resource may be multiplexed by FDM by using comb arrangement. A CSI-RS may be mapped in the frequency domain according to comb.

Comb density may be configured by higher layer signaling, or may be prescribed by a specification.

The frequency resource indices (comb index, comb value, for example, comb #1, comb #2, and the like) may be configured by higher layer signaling. The association (mapping) with antenna ports different from a plurality of frequency resource indices may be prescribed by a specification.

Figure 21:
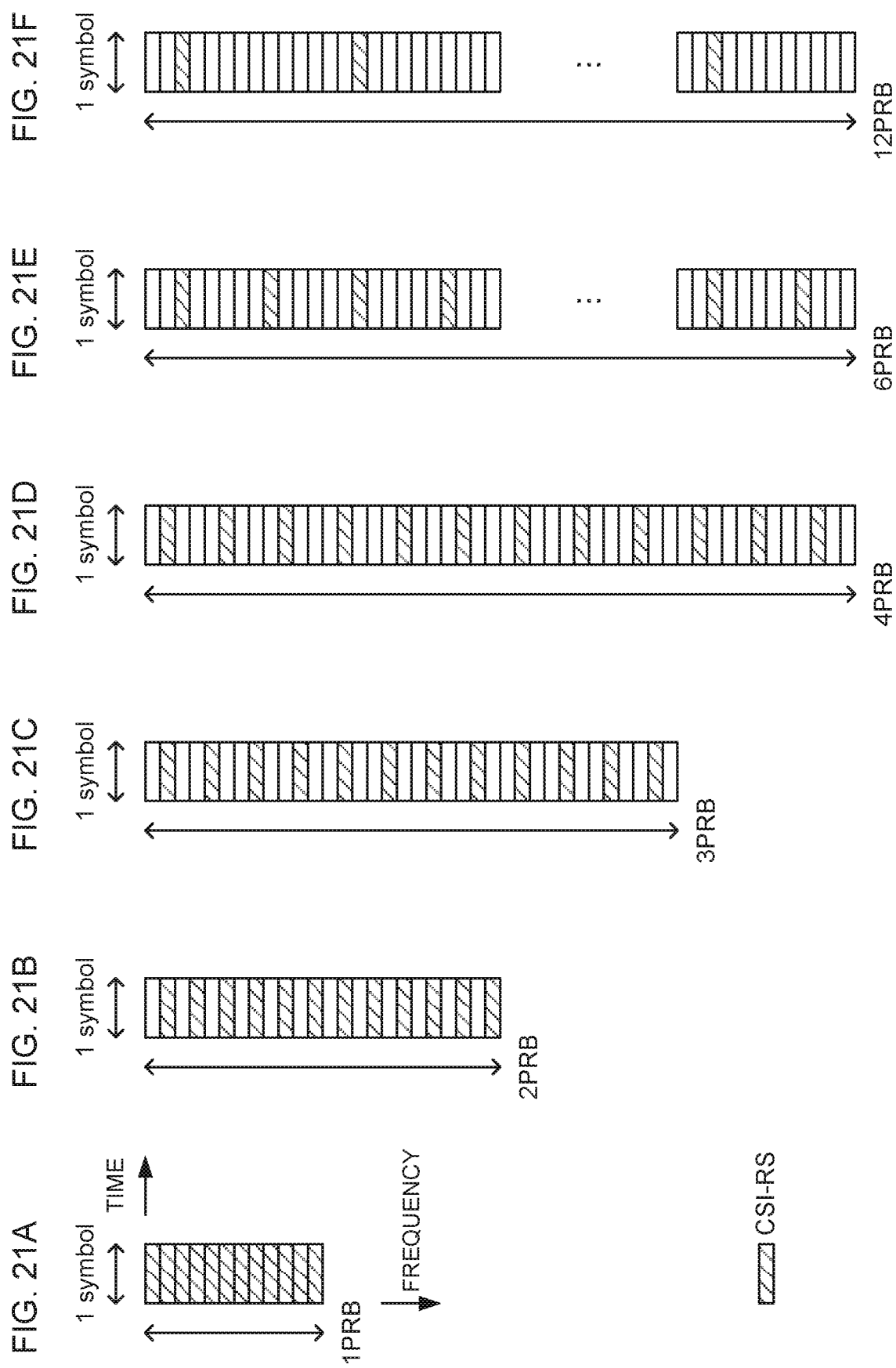
FIGS. 21A to 21F are diagrams to show an example of CSI-RS to which comb is applied.

The CSI-RS sequence may be mapped to REs used for the transmission. As shown in FIG. 21A, in a case where the comb density is one, the CSI-RSs are mapped to contiguous PRBs. As shown in FIG. 21B, in a case where the comb density is two, the CSI-RSs are mapped to one RE for each two REs. As shown in FIG. 21C, in a case where the comb density is three, the CSI-RSs are mapped to one RE for each three REs. As shown in FIG. 21D, in a case where the comb density is four, the CSI-RSs are mapped to one RE for each four REs. As shown in FIG. 21E, in a case where the comb density is six, the CSI-RSs are mapped to one RE for each six REs. As shown in FIG. 21F, in a case where the comb density is 12, the CSI-RSs are mapped to one RE for each 12 REs.

The CSI-RS sequence punctured in accordance with comb may be mapped to REs used for the transmission.

By using a low PAPR sequence and comb for CSI-RSs, it is possible to enlarge the band of the CSI-RSs while keeping the low PAPR.

According to this embodiment, the UE can appropriately receive CSI-RSs of a plurality of antenna ports. By CSI-RSs of a low PAPR sequence being used, it is possible to suppress the interference and improve the accuracy of CSI measurement.

Second Embodiment

Even in a case where the CSI-RS sequence is a low PAPR sequence, it is considered that FDM of a plurality of CSI-RSs causes high PAPR.

For example, as shown in FIG. 10A mentioned above, a PAPR in a case where CSI-RSs of a low PAPR sequence associated with ports #0 to #3 and CSI-RSs of a low PAPR sequence associated with ports #4 to #7 are multiplexed by FDM is higher than a PAPR of each CSI-RS.

CSI-RS may be in accordance with at least one of the following CSI-RS transmission methods 1 and 2.

<<CSI-RS Transmission Method 1>>

A plurality of transmitters for DL transmission may transmit CSI-RSs at the same time. Transmitters, tranceivers, transmission/reception points (TRPs), high frequency (radio frequency (RF)) units (circuits), panels, antenna panels, antenna port groups, RS port groups, and CORESET groups may be interchangeably interpreted. One cell may be covered by using a plurality of TRPs.

Figure 22:
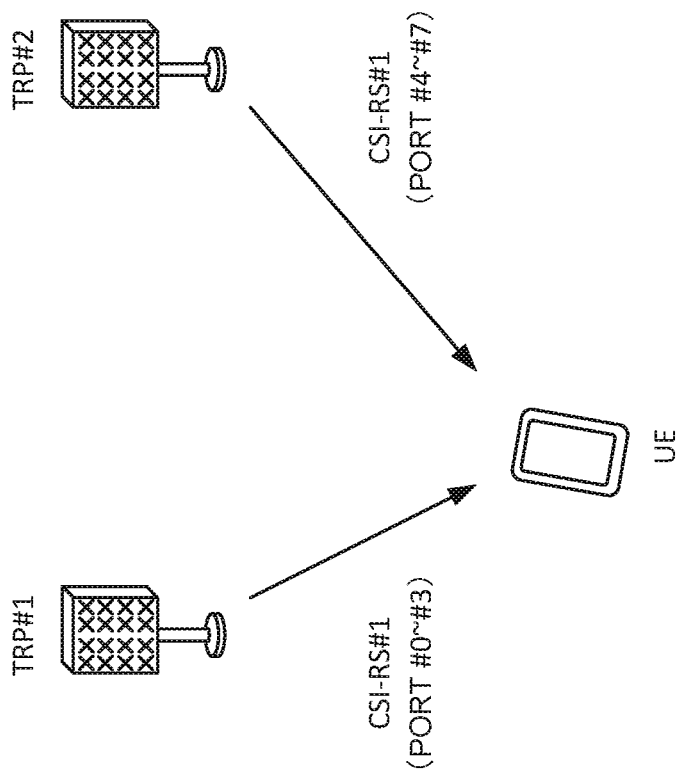
FIG. 22 is a diagram to show an example of CSI-RS transmission of a plurality of TRPs.

For example, as shown in FIG. 22, a TRP #1 may transmit a CSI-RS #1 of ports #0 to #3 (antenna port group #1), and a TRP #2 may transmit a CSI-RS #1 of port #4 to #7 (antenna port group #2). As shown in FIG. 10A mentioned above, the CSI-RS of the antenna port group #1 and the CSI-RS of the antenna port group #2 may be multiplexed by FDM. The UE may receive the CSI-RS of the antenna port group #1 and the CSI-RS of the antenna port group #2 in one symbol.

The CSI-RS resource for the first antenna port group and the CSI-RS resource for the second antenna port group may be configured independently. The CSI-RS of the first antenna port group and the CSI-RS of the second antenna port group may have different phases from each other, or may not have QCL relation (may be associated with different QCL parameters). The QCL parameters may be RSs (for example, an RS index, a resource index, and the like) for QCL. CSI-RSs of a plurality of antenna ports in one antenna port group may have QCL relation (may be associated with the same QCL parameter). The UE may be configured with at least one of QCL parameters and TCI states for each at least one of antenna ports, antenna port groups, and CSI-RS resources.

TCI states of a plurality of PDSCHs associated with antenna port groups different from each other may indicate CSI-RS resources different from each other.

Figure 23B:
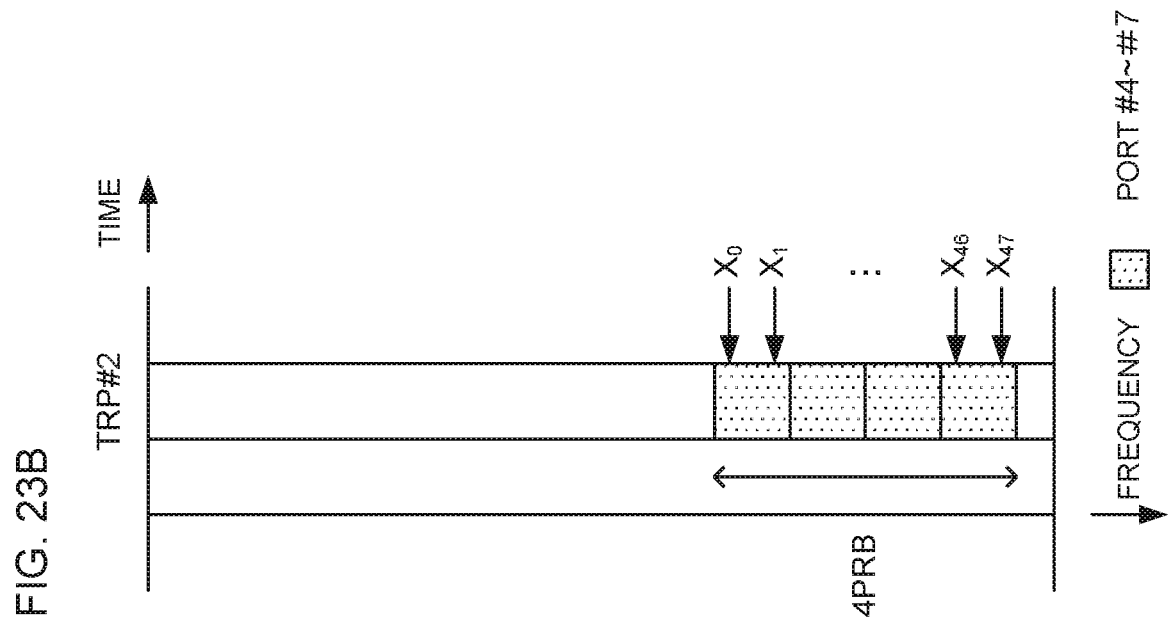
FIGS. 23A and 23B are diagrams to show an example of CSI-RS transmitted by a plurality of TRPs.
Figure 23A:
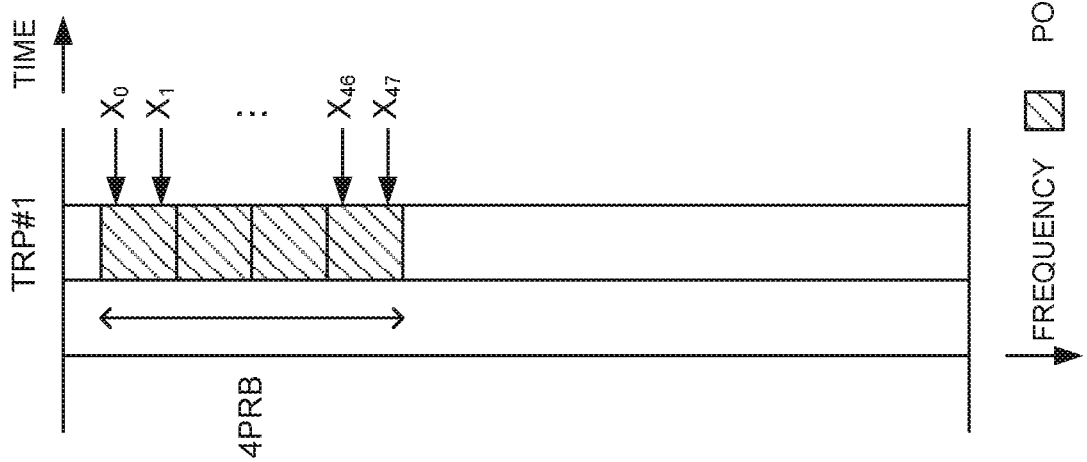

For example, as shown in FIG. 23A, the TRP #1 may transmit a CSI-RS in which a low PAPR sequence $X_0, X_1, \ldots, X_{47}$ associated with ports #0 to #3 is mapped to four PRBs (48 REs). As shown in FIG. 23B, the TRP #2 may transmit a CSI-RS in which a low PAPR sequence $X_0, X_1, \ldots, X_{47}$ associated with ports #4 to #7 is mapped to other four PRBs (48 REs) in the same symbol.

<<CSI-RS Transmission Method 2>>

One CSI-RS for at least one of a plurality of UEs and a plurality of antenna ports may be transmitted for each band of a specific type. A band of a specific type may be interpreted as a bandwidth part (BWP), a component carrier (CC), a system band, and the like.

One CSI-RS may be transmitted in one symbol on one serving cell. One CSI-RS may be transmitted by one transmitter. A CSI-RS may be transmitted cell-specifically. A CSI-RS resource configured by a UE may be specific to the UE.

A CSI-RS may be mapped by using comb.

A width (CSI-RS transmission bandwidth, CSI-RS sequence length) of a band (CSI-RS transmission band) of a transmitted CSI-RS may be greater than a width (CSI-RS resource bandwidth) of a band (CSI-RS resource band, CSI-RS measurement band, CSI-RS configuration band) of a CSI-RS resource configured for at least one of measurement and report. The CSI-RS transmission band may include a CSI-RS resource band.

For example, as shown in FIG. 24, a CSI-RS of a low PAPR sequence having the sequence length M may be mapped to the entire BWP (CSI-RS transmission band) and transmitted. The UE may be configured with a CSI-RS resource having a part of band (CSI-RS resource band) of a BWP for at least one of measurement and report.

A CSI-RS transmission band (CSI-RS transmission bandwidth, CSI-RS sequence length) and a CSI-RS resource for at least one of measurement and report may be configured independently. The CSI-RS transmission band (CSI-RS transmission bandwidth, CSI-RS sequence length) may not be configured. For example, the CSI-RS transmission bandwidth may be a width of the band (BWP or system band).

The UE may be configured with a plurality of CSI-RS resources corresponding to a plurality of antenna ports. The plurality of CSI-RS resources may have different CSI-RS resource bands of the same symbol. Thereby, similarly to FDM of a plurality of CSI-RS, it is possible to improve the frequency utilization efficiency.

By one CSI-RS sequence being transmitted over a CSI-RS transmission band, it is possible to suppress PAPR in low. As in the CSI-RS transmission method 1, in a case where two CSI-RSs are transmitted by different transmitters, it is difficult to keep phase continuity. However, as in the CSI-RS transmission method 2, by transmitting one CSI-RS over the CSI-RS transmission band, the phase continuity is kept in a plurality of CSI-RS resource bands in the CSI-RS transmission band.

By transmitting the CSI-RS in a band larger than the CSI-RS resource, it is possible to lengthen the CSI-RS sequence, increase the number of CSI-RSs which can be multiplexed in the same symbol and the same band, and suppress the cross-correlation between the multiplexed CSI-RSs in low.

Figure 25:
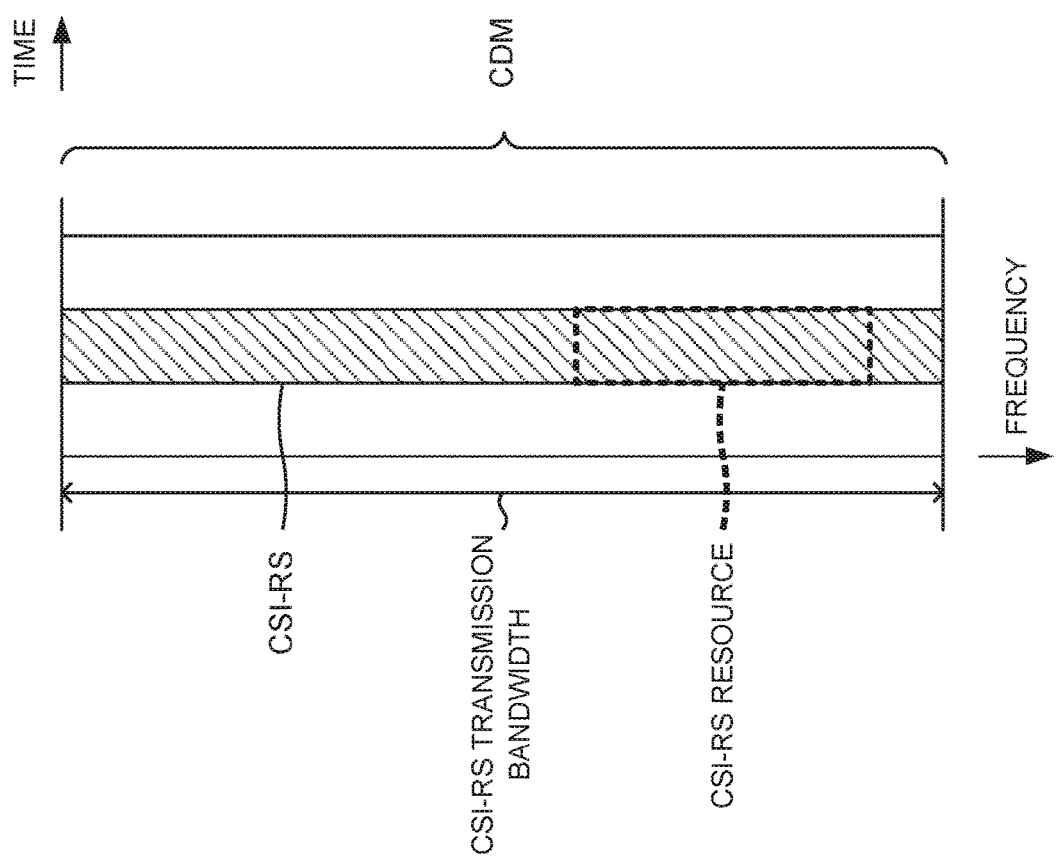
FIG. 25 is a diagram to show an example of the CSI-RS transmission band to which CDM is applied.

As shown in FIG. 25, CDM (CDM index) may be applied to the whole of the CSI-RS transmission band. The CDM may be at least one of OCC (at least one of FD-OCC and TD-OCC) and CS. The CDM index may be interpreted as an orthogonal index, sequence index, OCC index, CS index, and the like for. The UE may be configured with a CDM index for the CSI-RS transmission band. The UE may receive the CSI-RS of the whole of the CSI-RS transmission band.

The CSI-RS transmission bandwidth may be determined based on the length of the sequence (at least one of low PAPR sequence and OCC) for CDM. The length of the sequence for CDM may be determined based on the CSI-RS transmission bandwidth.

The UE may measure the CSI in the CSI-RS resource band. Even in this case, CDM may be applied to the whole of the CSI-RS transmission band to keep orthogonality of the CSI-RS sequence.

The UE measures the whole of the CSI-RS transmission band, and may separate the received signals of each antenna port by using configured CDM indices. The UE may acquire the CSI of the whole of the CSI-RS transmission band.

The UE may measure the CSI only in the CSI-RS resource for at least one of measurement, report, CSI report, layer 1 (L1)-reference signal received power (RSRP), L1-signal to interference plus noise (SINR), interference, CSI feedback, and L3-RSRP.

Figure 26:
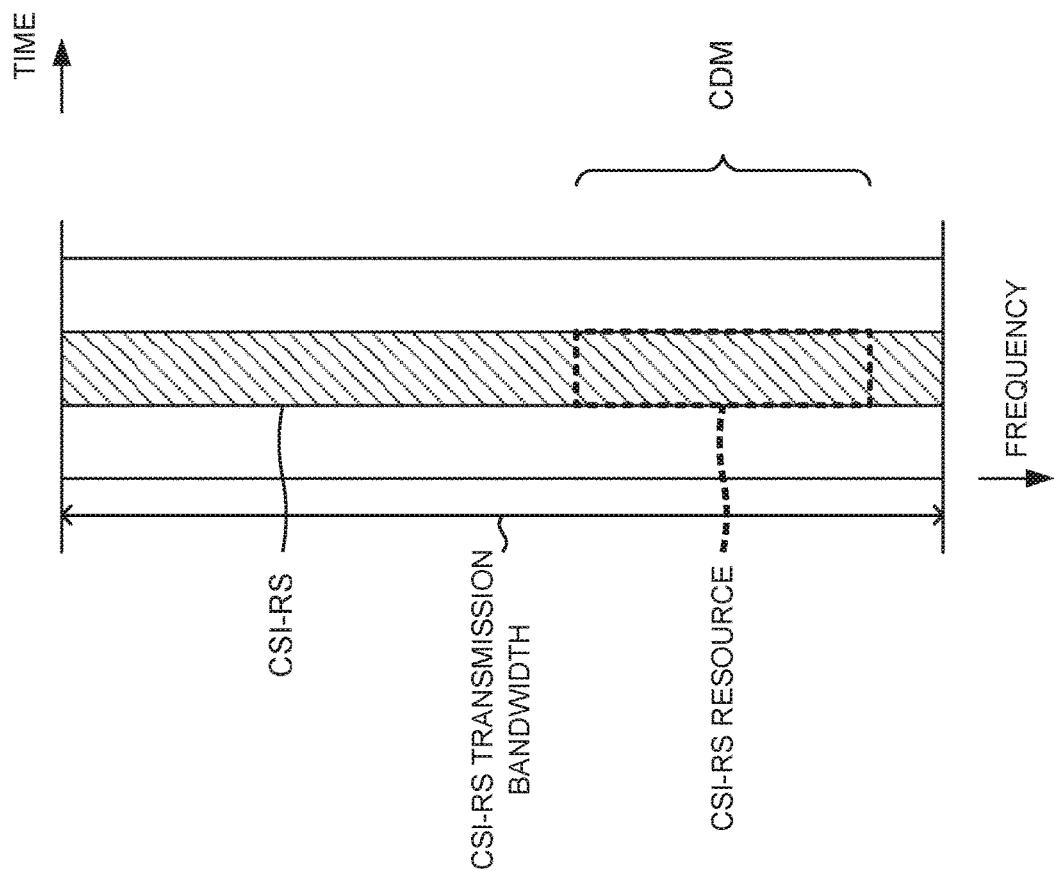
FIG. 26 is a diagram to show an example of the CSI-RS resource band to which CDM is applied.

As shown in FIG. 26, the UE may apply CDM to the CSI-RS resource band.

The CSI-RS resource bandwidth may be determined based on the length of the sequence (at least one of low PAPR sequence and OCC) for CDM. The length of the sequence for CDM may be determined based on the CSI-RS resource bandwidth.

A CDM index may be applied to the CSI-RS resource band. The UE may be configured with a CDM index for the CSI-RS resource band. The UE may receive the CSI-RS only for the CSI-RS resource band. By the UE receiving the CSI-RS only for the CSI-RS resource band, the UE receives the band that is narrower compared to a case of receiving the CSI-RS of the whole the CSI-RS transmission band, so it is possible to suppress the power consumption (it is possible to save the battery of the UE).

Figure 27:
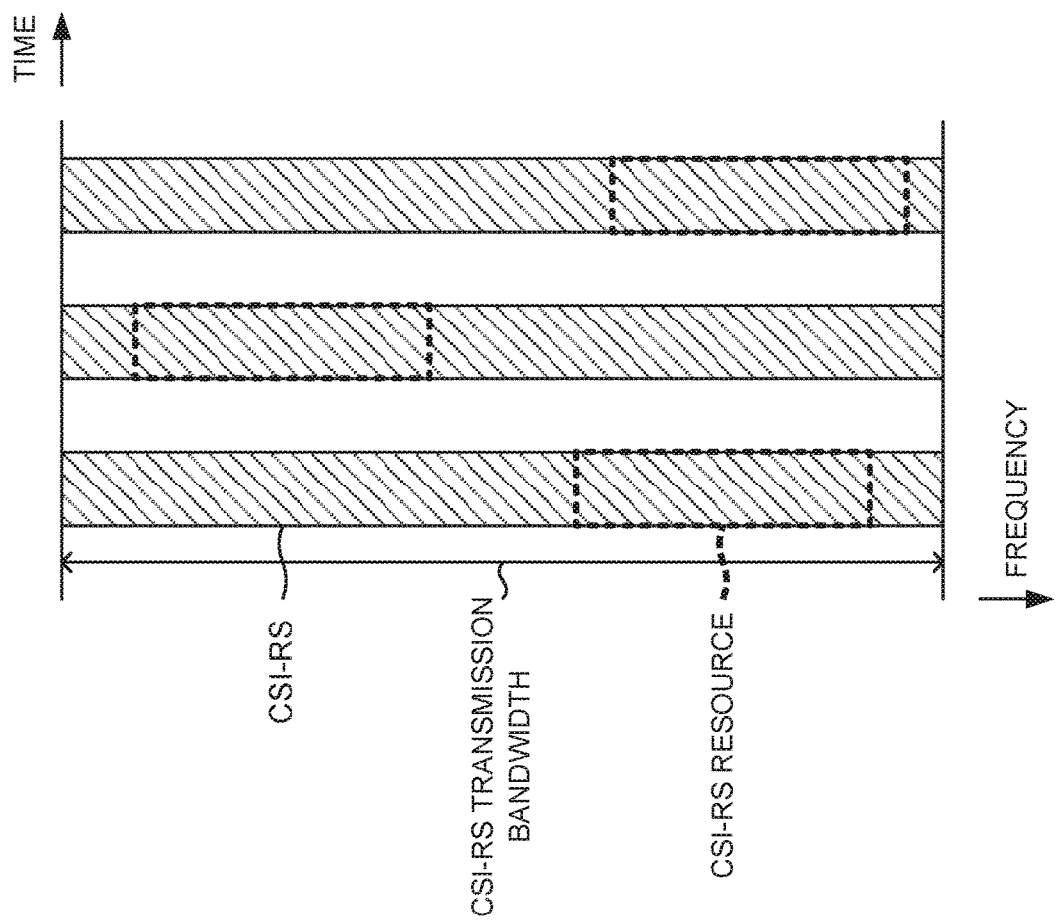
FIG. 27 is a diagram to show an example of the frequency hopping of the CSI-RS resource band.

As shown in FIG. 27, the CSI-RS resource band may hop in at least one of the symbol level and the slot level (frequency hopping). The hopping function to the CSI-RS resource band may include at least one of symbol indices, slot indices, and UE indices (for example, RNTI). In other words, the CSI-RS resource band may be based on at least one of symbol indices, slot indices, and UE indices (for example, RNTI).

The CSI-RS resource may extend over a plurality of discontinuous symbols. The CSI-RS resource band is a part of the CSI-RS transmission band, an may hop based on symbol indices.

In this case, the UE can measure a wide measurement bandwidth.

According to this embodiment, the UE can measure CSI-RS resources of a plurality of antenna ports in the same symbol, and it is possible to improve frequency utilization efficiency.

Third Embodiment

In FIG. 24 mentioned above, in a case where the UE monitors a bandwidth (for example, CSI-RS transmission bandwidth) that is wider than the CSI-RS resource bandwidth, the UE consumes a great power in the CSI-RS monitoring.

The CSI-RS transmission band may be a part of a band of a specific type. The CSI-RS transmission band may hop in a band of a specific type. A band of a specific type may be interpreted as a BWP, a CC, a system band, and the like.

Figure 28:
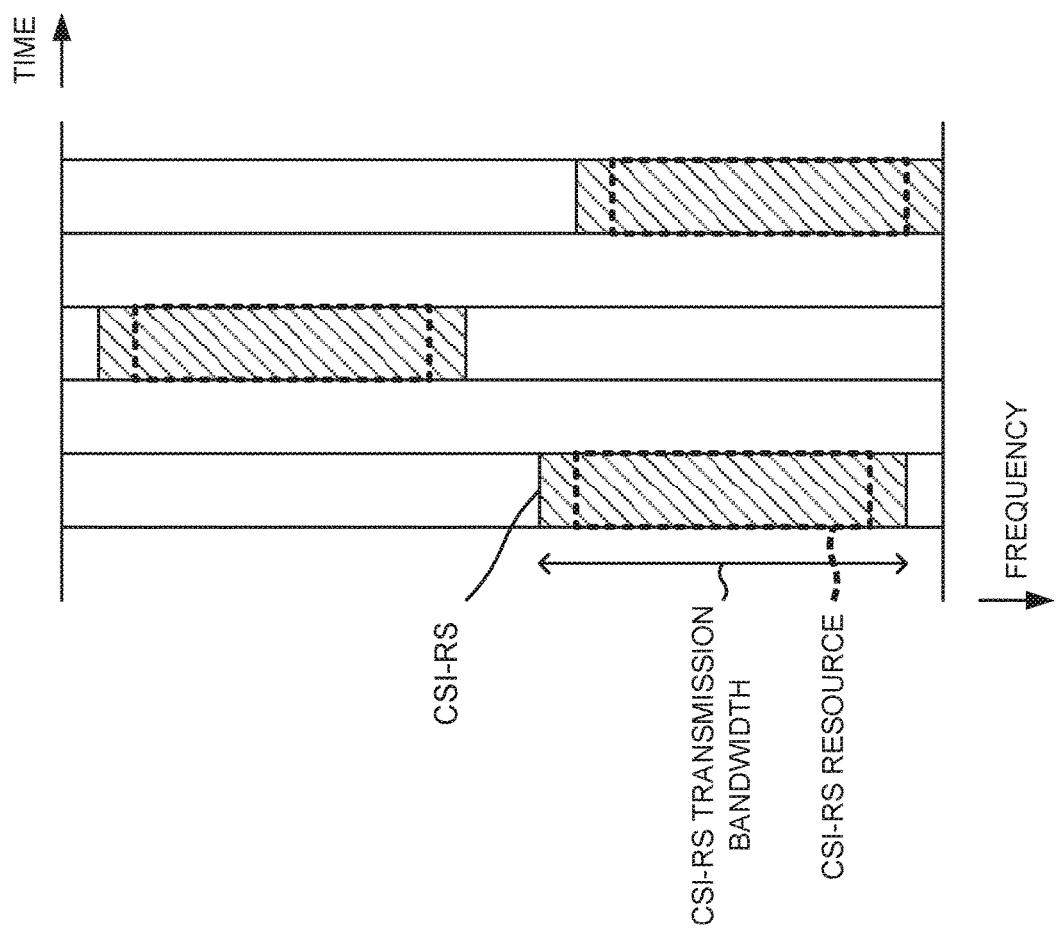
FIG. 28 is a diagram to show an example of the frequency hopping of the CSI-RS transmission band.

As shown in FIG. 28, the CSI-RS transmission band may hop in at least one of the symbol level and the slot level (frequency hopping). The hopping function to the CSI-RS transmission band may include at least one of symbol indices, slot indices, and UE indices (for example, RNTI). In other words, the CSI-RS resource band may be based on at least one of symbol indices, slot indices, and UE indices (for example, RNTI).

The CSI-RS resource band may be the whole of the CSI-RS transmission band, or may be a part of the CSI-RS transmission band. The CSI-RS resource band may hop in at least one of the symbol level and the slot level.

By the CSI-RS transmission band being a part of the band of the specific type, compared to a case in which the CSI-RS transmission band is the whole of the band of the specific type, it is possible to reduce the power consumption of the UE.

Figure 29:
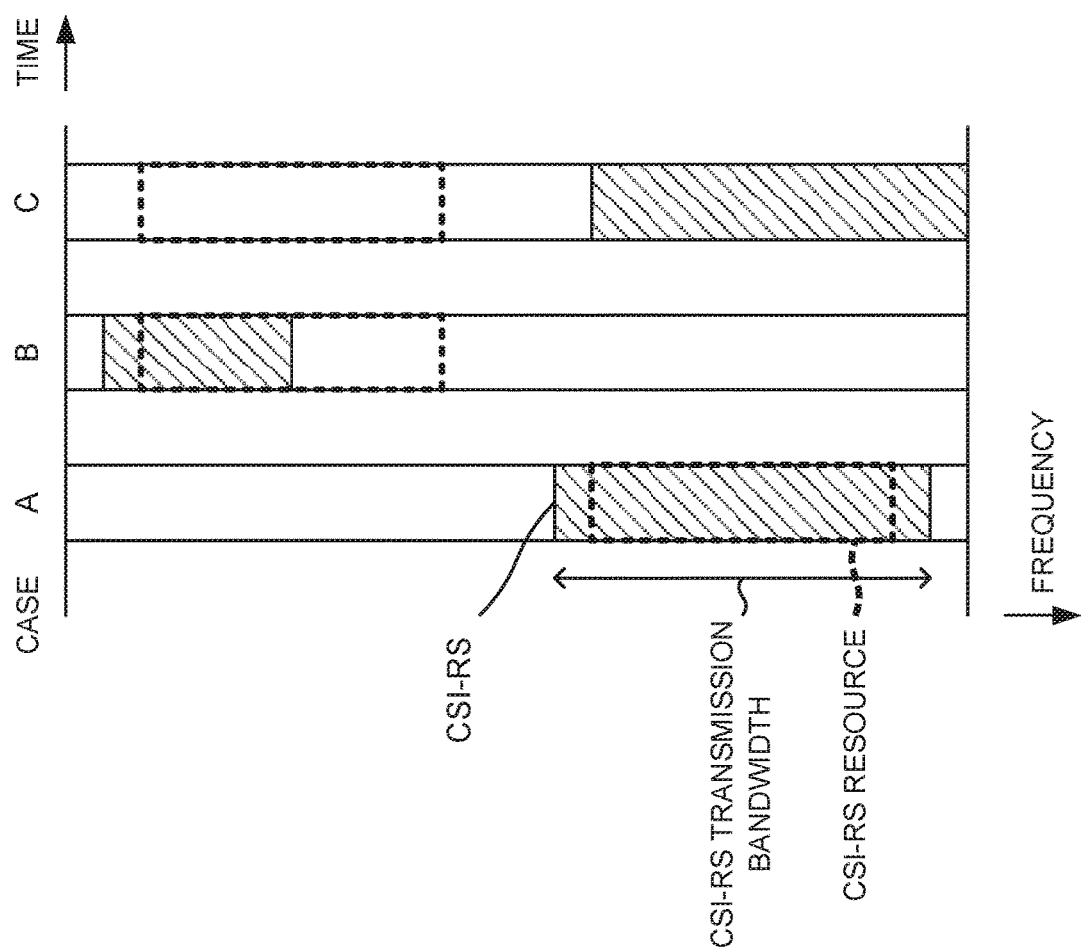
FIG. 29 is a diagram to show an example of the relationship between the CSI-RS transmission band and the CSI-RS resource band.

In a case where the CSI-RS resource band is included in the CSI-RS transmission band (for example, case A of FIG. 29), the UE may measure CSI in the CSI-RS resource band and report the CSI.

In a case where the CSI-RS resource band partially overlaps with the CSI-RS transmission band (for example, case B of FIG. 29), the UE may measure CSI in the part of the CSI-RS resource band overlapping with the CSI-RS transmission band and report the CSI. In a case where the CSI-RS resource band partially overlaps with the CSI-RS transmission band, the UE may measures CSI in the whole of the CSI-RS transmission band and report the CSI. In a case where the CSI-RS resource band partially overlaps with the CSI-RS transmission band, the UE may drop CSI report without measuring CSI (may not perform report).

In a case where the CSI-RS resource band does not overlap with the CSI-RS transmission band (for example, case C of FIG. 29), the UE may measures CSI in the whole of the CSI-RS transmission band and report the CSI. In a case where the CSI-RS resource band partially overlaps with the CSI-RS transmission band, the UE may drop CSI report without measuring CSI (may not perform report).

According to this embodiment, the UE receives the CSI-RS of a part of the band, so it is possible to suppress the power consumption (it is possible to save the battery of the UE).

Fourth Embodiment

Data and CSI-RS may be multiplexed. The data may be interpreted as data carried by a PDSCH or a PDSCH.

According to one of the multiplexing methods 1 and 2 described below, data and CSI-RS may be multiplexed.

The UE may be configured with (may switch) one of the multiplexing methods 1 and 2 by higher layer signaling.

In a case where the multiplexing method 1 is configured, the UE may assume that the CSI-RS is a low PAPR sequence. In a case where the multiplexing method 2 is configured, the UE may assume that the CSI-RS is a sequence (for example, pseudo-random sequence) of Rel. 15.

<<Multiplexing Method 1>>

Data and CSI-RS may be multiplexed by TDM.

In a case where the CSI-RS sequence is a low PAPR sequence, FDM of data and CSI-RS may cause a large PAPR. By data and CSI-RS being multiplexed by TDM, it is possible to suppress the PAPR of the CSI-RS in low.

The UE may be configured with at least one of CSI-RS and PDSCH according to one of the following configuration methods 1 and 2.

[Configuration Method 1]

The UE may not expect that CSI-RS and PDSCH are configured on the same OFDM symbol. The UE may not expect that CSI-RS and PDCCH are configured on the same symbol. The UE may not expect that CSI-RS and DMRS of PDSCH are configured on the same OFDM symbol. The UE may not expect that CSI-RS and DMRS of PDCCH are configured on the same symbol.

[Configuration Method 2]

In a case where the UE is configured with CSI-RS and DL transmission (channel/signal) of a specific type on the same OFDM symbol, the UE may not be required to perform monitor or measurement of CSI-RS on the OFDM. In a case where the UE is configured with CSI-RS and DL transmission of a specific type on the same OFDM symbol, the UE may not be required to perform monitoring or measurement of all CSI-RS resources with which at least one OFDM symbol overlaps. In a case where the UE is configured with CSI-RS and DL transmission of a specific type on the same OFDM symbol, the UE may not be required to perform at least one of monitoring, measurement, decoding, and demodulation of the DL transmission of the specific type on the OFDM symbol. In a case where the UE is configured with CSI-RS and DL transmission of a specific type on the same OFDM symbol, the UE may not be required to perform at least one of monitoring, measurement, decoding, and demodulation of the DL transmission of the specific type with which at least one OFDM symbol overlaps.

The time domain location of the CSI-RS may be different from the time domain location of the CSI-RS of Rel. 15. The CSI-RS may be located only before or after a PDSCH symbol. The CSI-RS may not cut in a PDSCH.

Figure 30:
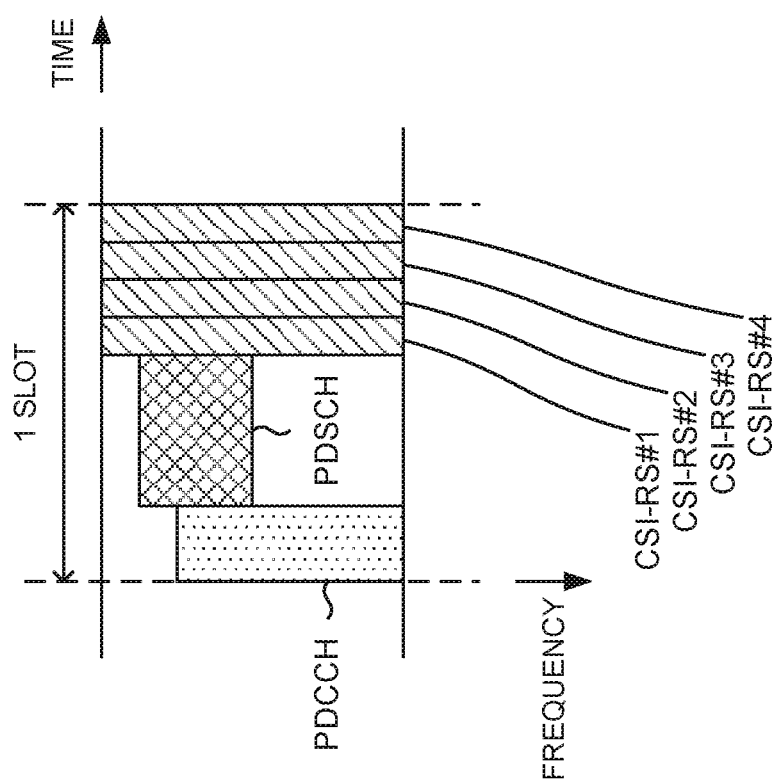
FIG. 30 is a diagram to show an example of CSI-RS in the PDSCH transmission of one slot.

As shown in FIG. 30, a CSI-RS may be allocated after a PDSCH in one slot. For example, the UE may assume that the CSI-RS in the last N symbols of a certain period is configured (indicated, activated). The period may be one of a slot, a sub-slot, and a subframe. The UE may be configured with N (for example, 4).

In FR4, assuming that aggregation or repetition of a plurality of slots is used, the limit of the last N symbols may not be sufficient.

The UE may assume that the CSI-RS in the first N symbols or the last N symbols of M periods is configured (indicated, activated). The period may be one of a slot, a sub-slot, and a subframe. One PDSCH may be transmitted for the M periods, or M repetitions may be transmitted.

Figure 31:
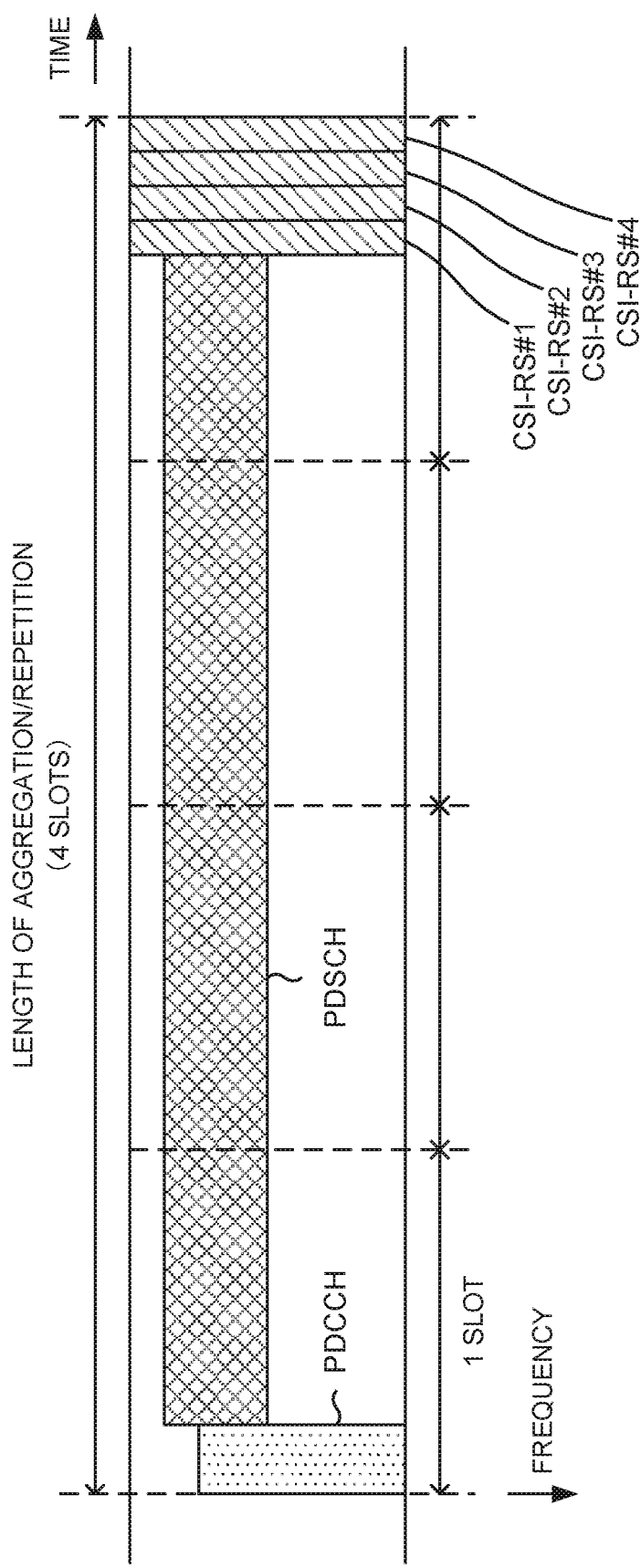
FIG. 31 is a diagram to show an example of CSI-RS in the PDSCH transmission for a plurality of slots.

For example, as shown in FIG. 31, in a case where the PDSCH for four slots is scheduled, the UE may assume that the CSI-RS in the last four symbols (N=4) of the last one slot (M=1) is configured (indicated, activated).

<<Multiplexing Method 2>>

Data and CSI-RS may be multiplexed by at least one of TDM and FDM.

Data and CSI-RS may be transmitted by different transmitters, and data and CSI-RS may be multiplexed by FDM. In this case, it is possible to suppress the PAPR of the CSI-RS in low. By data and CSI-RS being multiplexed by FDM, it is possible to improve the frequency utilization efficiency. Because channels (paths) and phases are different between data and CSI-RS, it is difficult to use the measurement result of the channel based on the CSI-RS multiplexed by FDM with data for the demodulation of data.

The CSI-RS may be mapped according to one of the following mapping methods 1 and 2.

[Mapping Method 1]

After CSI-RS mapping, DFT-s-OFDM may be applied. The CSI-RS mapping may be the same as the CSI-RS of above-mentioned Rel. 15.

Figure 32:
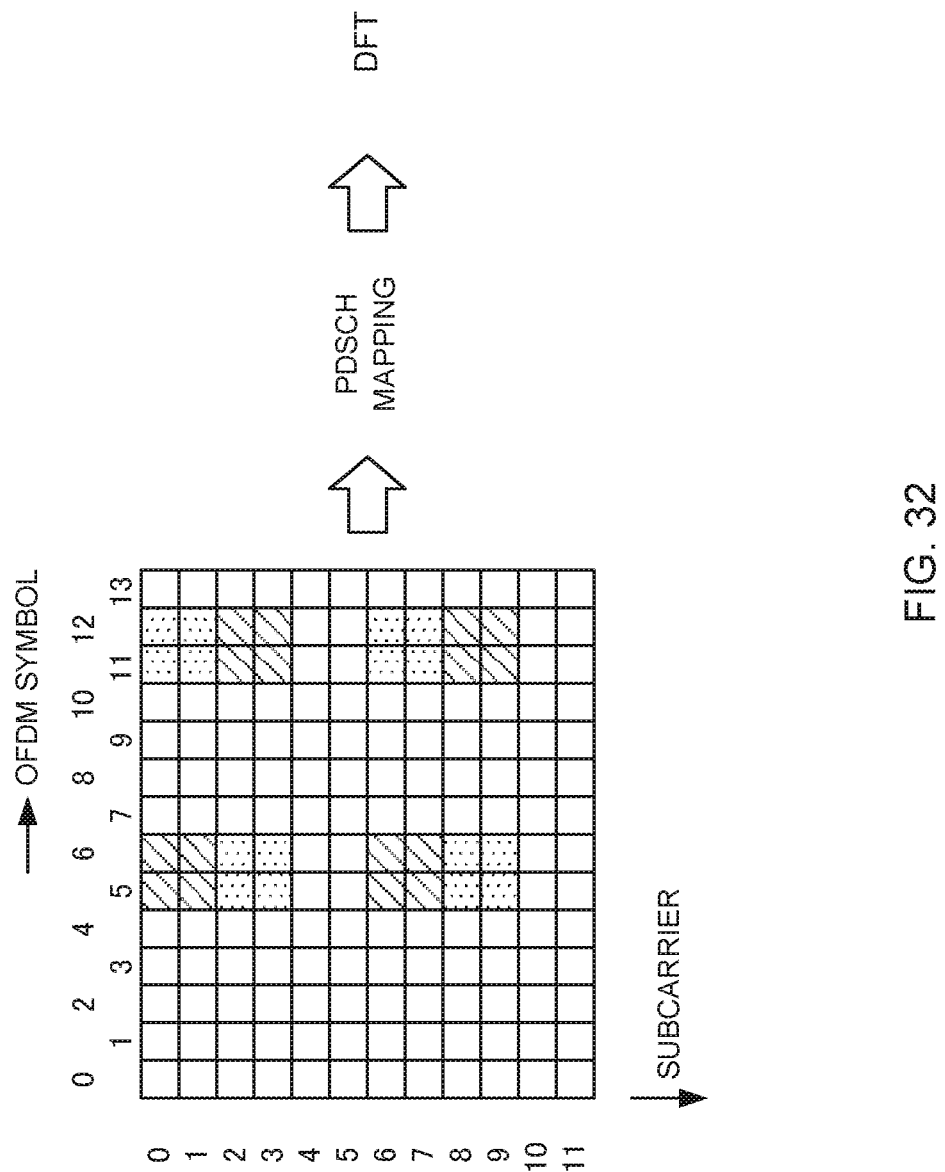
FIG. 32 is a diagram to show an example of the CSI-RS transmission using DFT-s-OFDM.

For example, as shown in FIG. 32, the CSI-RS sequence may be mapped, the PDSCH may be mapped, and then DFT-s-OFDM may be applied to the obtained signal. The CSI-RS may be a high PAPR sequence (for example, pseudo-random sequence) or may be a low PAPR sequence.

By applying DFT-s-OFDM, it is possible to suppress the PAPR.

[Mapping Method 2]

The CSI-RS may be mapped to the time domain before DFT.

Figure 33:
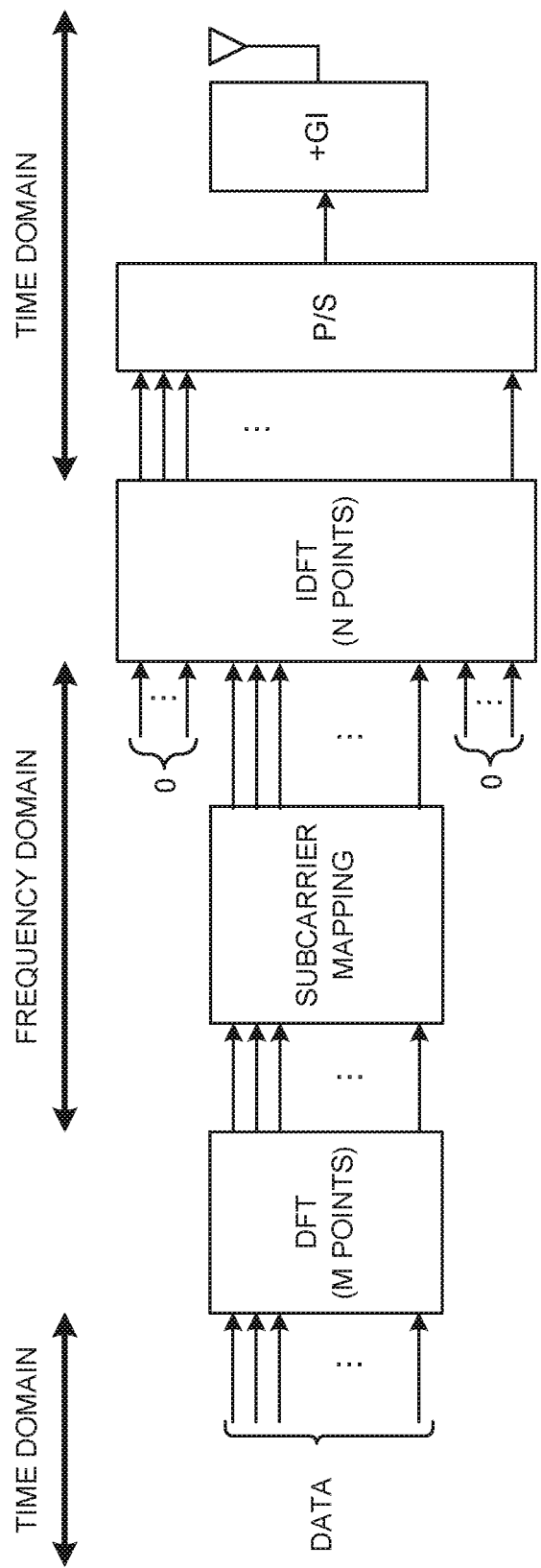
FIG. 33 is a diagram to show an example of a structure using DFT-s-OFDM.

As shown in FIG. 33, the CSI-RS sequence may be mapped to the time domain and may be converted by M point DFT. The output (frequency domain) of the M point DFT is mapped to M subcarriers in N subcarriers (subcarrier mapping), and may be converted by N point IDFT. The output (time domain) of the N point IDFT may be converted by parallel/serial (P/S) conversion, added with a guard interval, and transmitted.

The CSI-RS sequence may be a low PAPR sequence, may be a pseudo-random sequence, or may be another sequence.

Figure 34A:
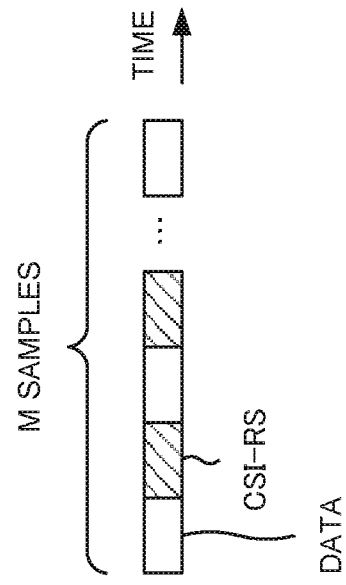
FIGS. 34A and 34B are diagrams to show an example of DFT-s-OFDM for data to which CSI-RS is inserted.
Figure 34B:
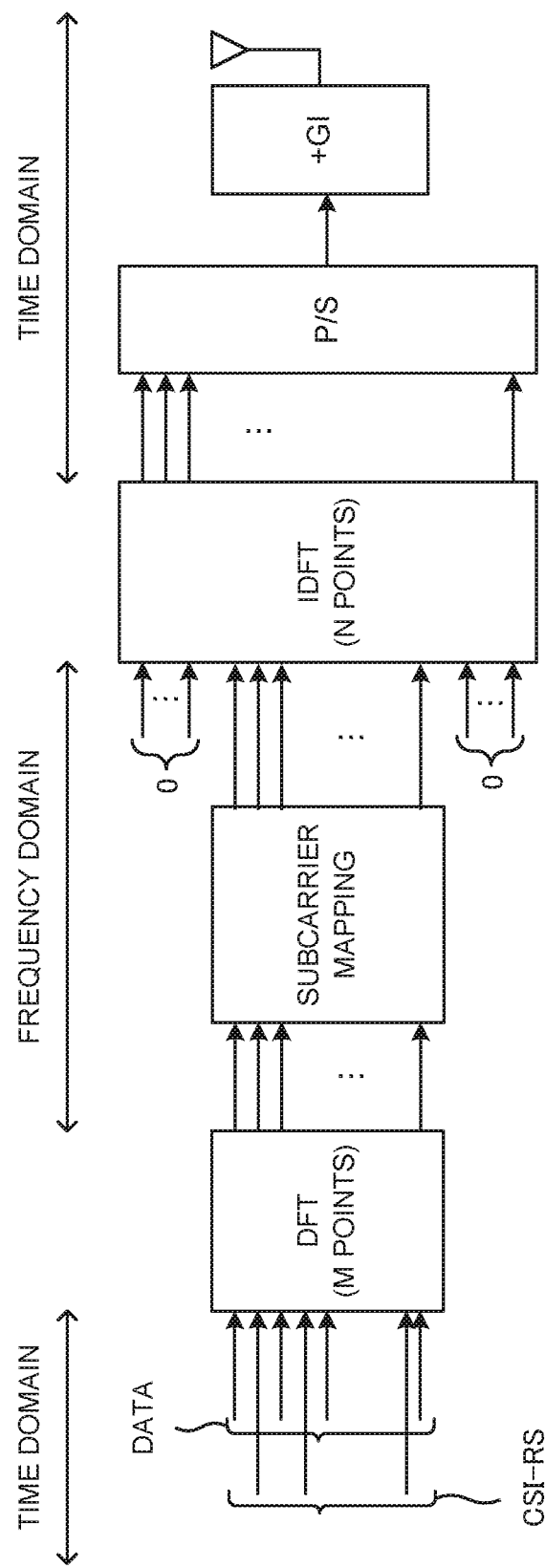

As shown in FIG. 34A, a sample of CSI-RS may be inserted into the sample of the data in the time domain. As shown in FIG. 34B, the data into which the CSI-RS is inserted may be input into M point DFT, and may be transmitted similarly to FIG. 33.

According to this embodiment, it is possible to appropriately multiplex data and CSI-RS.

Fifth Embodiment

The low PAPR sequence of the CSI-RS may be configured similarly to a sequence of a sounding reference signal (SRS). The low PAPR sequence of the CSI-RS may be the same as a sequence of an SRS.

At least one of the following mechanisms (SRS structure, SRS resource) for the SRS may be used for the CSI-RS.

Sequence generation (for example, low PAPR sequence generation)
Resource allocation
Sequence hopping
Frequency hopping The number of antenna ports of the CSI-RS may be limited by a maximum number P. P may be smaller than the maximum number of antenna ports of CSI-RS or SRS of Rel. 15. P may be greater than the maximum number of antenna ports of SRS, may be greater than the maximum number of antenna ports of SRS of Rel. 15, or may be greater than the maximum number of antenna ports of CSI-RS of Rel. 15.

In a frequency (for example, FR4) that is higher than a certain frequency, at least one parameter of the maximum number of antenna ports of CSI-RS, the maximum number of MIMO layers, and the maximum number of multiplexed UEs may be smaller or greater than a parameter in a frequency (for example, FR1) that is lower than a certain frequency.

The CSI-RS resource including the CSI-RS sequence may be configured or determined cell-specifically.

The CSI-RS resource including the CSI-RS sequence may be configured or determined UE-specifically.

At least one of measurement and report may be supported to at least one of periodic (P)-CSI-RS, semi-persistent (SP)-CSI-RS, and aperiodic (A)-CSI-RS.

The transmit power of CSI-RS specific to cell may be configured or determined by a ratio to the DL transmission of the specific type. For example, the DL transmission of the specific type may be one of SSB, PDCCH, and PDSCH.

The transmit power of CSI-RS specific to UE may be determined based on the transmission power control of the SRS. In this case, it is possible to improve the performance to the UE at the cell edge.

For the determination of the transmit power of the CSI-RS specific to the UE, the UE may perform measurement or report of the path loss. For the base station to estimate the path loss for the determination of the transmit power of the CSI-RS specific to the UE, the UE may transmit a RS (for example, SRS). The RS may be referred to as a path loss measurement UL RS, and the like.

According to this embodiment, implementation is facilitated by determining the CSI-RS resource based on the SRS resource.

Sixth Embodiment

Both low PAPR sequence and high PAPR sequence (for example, CSI-RS sequence, pseudo-random sequence of Rel. 15) may be supported for CSI-RS.

The CSI-RS sequence may be configured by at least one of the following configuration methods 1 and 2.

<<Configuration Method 1>>

The UE may be explicitly configured, indicated, or activated with the low PAPR sequence or the high PAPR sequence for the CSI-RS based on at least one of higher layer signaling, MAC CE, and DCI.

<<Configuration Method 2>>

The UE may be implicitly configured, indicated, or activated with the low PAPR sequence or the high PAPR sequence for the CSI-RS based on at least one of higher layer signaling, MAC CE, and DCI.

In a case where CP-OFDM is configured or applied to the channel/signal of the specific type, the UE may monitor or measure the CSI-RS of the high PAPR sequence. The channel/signal of the specific type may be a PDSCH or may be a PDCCH. The PAPR of CP-OFDM waveform may be higher than the PAPR of DFT-s-OFDM waveform.

In a case where DFT-s-OFDM is configured or applied to the channel/signal of the specific type, the UE may monitor or measure the CSI-RS of the low PAPR sequence. The PAPR of DFT-s-OFDM waveform may be lower than the PAPR of CP-OFDM waveform.

According to this embodiment, it is possible to use an appropriate CSI-RS sequence.

Seventh Embodiment

Symbols more than CSI-RS of Rel. 15 may be supported.

In a case where the SCS increases and the symbol length shortens, the number of the symbols to which CSI-RS is mapped may increase.

One CSI-RS resource may extend over a plurality of periods. The UE may receive one CSI-RS for a plurality of periods. The period may be one of a slot, a sub-slot, and a subframe. For example, one CSI-RS resource may extend over a plurality of slots.

TD-OCC may be applied to CSI-RS for a plurality of periods. For example, TD-OCC may be applied for a plurality of slots.

Figure 35A:
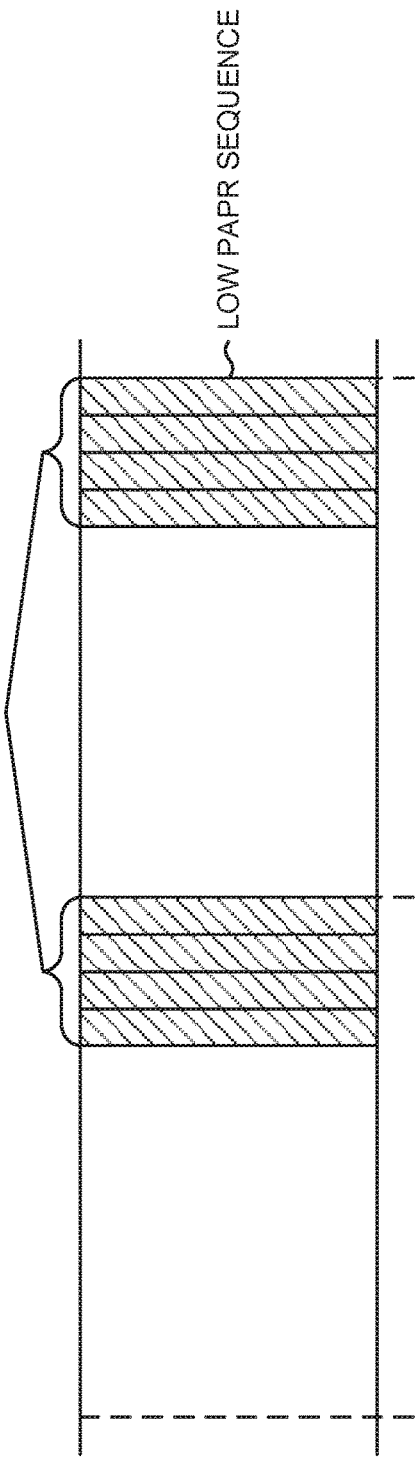
FIGS. 35A and 35B are diagrams to show an example of the CSI-RS transmission for a plurality of slots.

As shown in FIG. 35A, the UE may receive one CSI-RS using the low PAPR sequence for two slots. The time domain location and the frequency domain location in each slot may be the same.

Figure 35B:
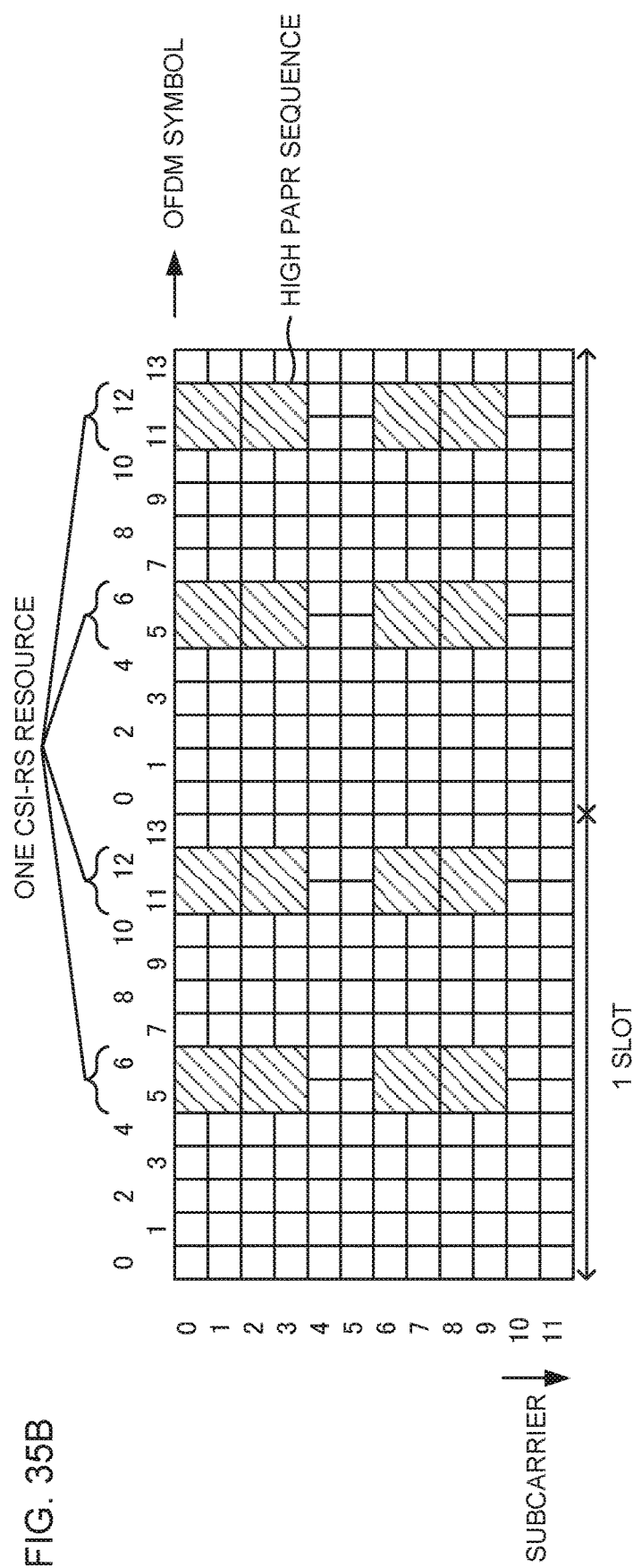

As shown in FIG. 35B, the UE may receive one CSI-RS using the high PAPR sequence (CSI-RS sequence of Rel. 15) for two slots. The time domain location and the frequency domain location in each slot may be the same as the CSI-RS of Rel. 15.

The CSI-RS (at least one of a CSI-RS resource, a CSI-RS sequence, a CSI-RS location) in one slot may be repeated for a plurality of slots. TD-OCC may be applied in one slot (each slot). In this case, the CSI-RS for one slot and the CSI-RS for a plurality of slots may be multiplexed by CDM by being multiplexed by TD-OCC for one slot.

The CSI-RS sequence may be generated for a plurality of slots. The CSI-RS sequence may be different by at least one of the slot and the symbol. TD-OCC may be applied for a plurality of slots. In this case, the CSI-RS for a plurality of slots and the CSI-RS for the same plurality of slots may be multiplexed by CDM by being multiplexed by TD-OCC for the same plurality of slots.

By mapping the CSI-RS for a plurality of symbols or a plurality of slots, it is possible to lengthen the CSI-RS sequence length, and it is possible to increase the number of multiplexed CSI-RSs. By multiplying TD-OCC for a plurality of symbols or a plurality of slots to the CSI-RS, it is possible to lengthen the TD-OCC length, and it is possible to increase the number of multiplexed CSI-RSs.

According to this embodiment, by mapping one CSI-RS to more symbols, it is possible to improve the measurement accuracy.

OTHER EMBODIMENTS

In a frequency (for example, at least one of FR2, FR3, and FR4) that is higher than a certain frequency (for example, 7.125 GHz, 24.25 GHz, 52.6 GHz, and the like), both the low PAPR sequence and the CSI-RS sequence (pseudo-random sequence, high PAPR sequence) of Rel. 15 may be supported for CSI-RS. The UE may be configured by higher layer signaling whether to use the low PAPR sequence or the high PAPR sequence for CSI-RS.

The base station having a particular function may transmit CSI-RS based on the CSI-RS sequence of Rel. 15.

In a frequency that is higher than a certain frequency, only the low PAPR sequence may be supported for CSI-RS. In a frequency that is higher than a certain frequency, the UE may not expect to receive CSI-RS of the CSI-RS sequence of Rel. 15.

The UE may report at least one of the following information related to the support of CSI-RS of the low PAPR sequence as a part of the UE capability.

Whether or not to support CSI-RS of low PAPR sequence
Maximum number of antenna ports
Multiplexing method (parameter relate to at least one of TDM, FDM, CDM (OCC, CS, and the like), and TRP) of a plurality of antenna ports
CSI-RS density (at least one density of time, frequency, and CS)

The CSI-RS may be non-zero power (NZP)-CSI-RS or may be zero power (ZP)-CSI-RS. Each embodiment mentioned above may be applied only to NZP-CSI-RS.

ZP-CSI-RS of Rel. 15 may be applied to ZP-CSI-RS in a frequency that is higher than a certain frequency. A problem of PAPR does not occur in ZP-CSI-RS.

The CSI-RS of the low PAPR sequence may be applied to ZP-CSI-RS in a frequency that is higher than a certain frequency. In CSI-RS mapping and the like, the NZP-CSI-RS and the ZP-CSI-RS using the same method enable processing of the UE to be simple.

In a case where the CSI-RS of the low PAPR sequence is configured or applied to the NZP-CSI-RS, the resource for the CSI-RS of the low PAPR sequence may be applied to the ZP-CSI-RS. In CSI-RS mapping and the like, the NZP-CSI-RS and the ZP-CSI-RS using the same method enable processing of the UE to be simple. In a case where the CSI-RS of the low PAPR sequence is not configured or applied to the NZP-CSI-RS, the ZP-CSI-RS of Rel. 15 may be applied.

In the present disclosure, a case of a frequency (for example, FR4) that is higher than a certain frequency, a case of a particular subcarrier spacing, and a case in which a particular subcarrier spacing is configured in a certain cell may be interchangeably interpreted. Note that the particular subcarrier spacing may be a subcarrier spacing that is greater than a certain value (for example, 120 kHz), or a subcarrier spacing in a case where a parameter p corresponding to the numerology is greater than a certain value (for example, 3).

The frequency range (for example, FR4) may be divided into a plurality of parts (for example, sub-frequency ranges or sub-FRs). At least one of the plurality of embodiments described above may be applied to the all or a part of frequencies of one frequency range. At least one of the plurality of embodiments described above may not be applied to frequencies except the frequencies above (for example, may be in accordance with Rel. 15).

The UE may acquire CSI by the measurement of a CSI-RS resource of at least one of a plurality of antenna ports to which at least one above-mentioned embodiment is applied.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 36:
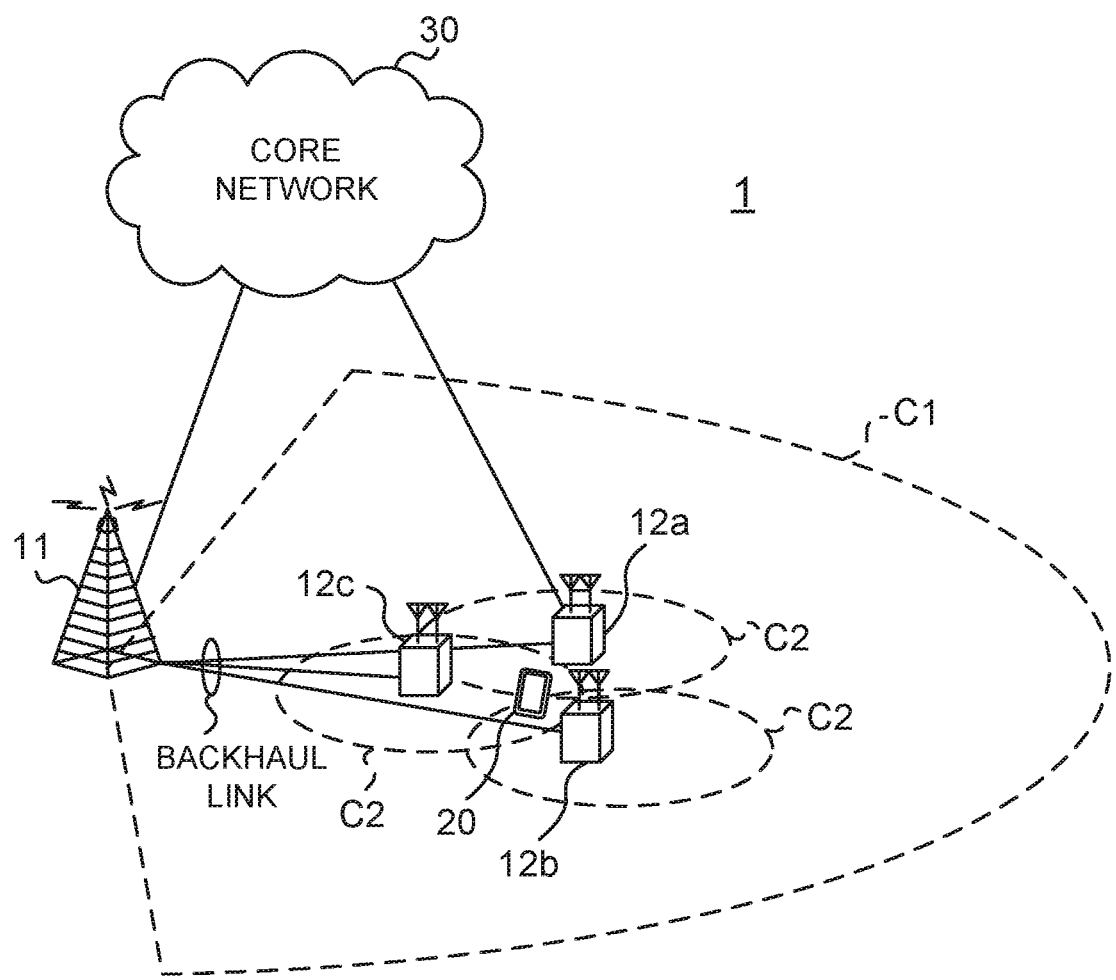
FIG. 36 is a diagram to show an example of a schematic structure of a radio communication system according to one embodiment.

FIG. 36 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information is communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on are communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 37:
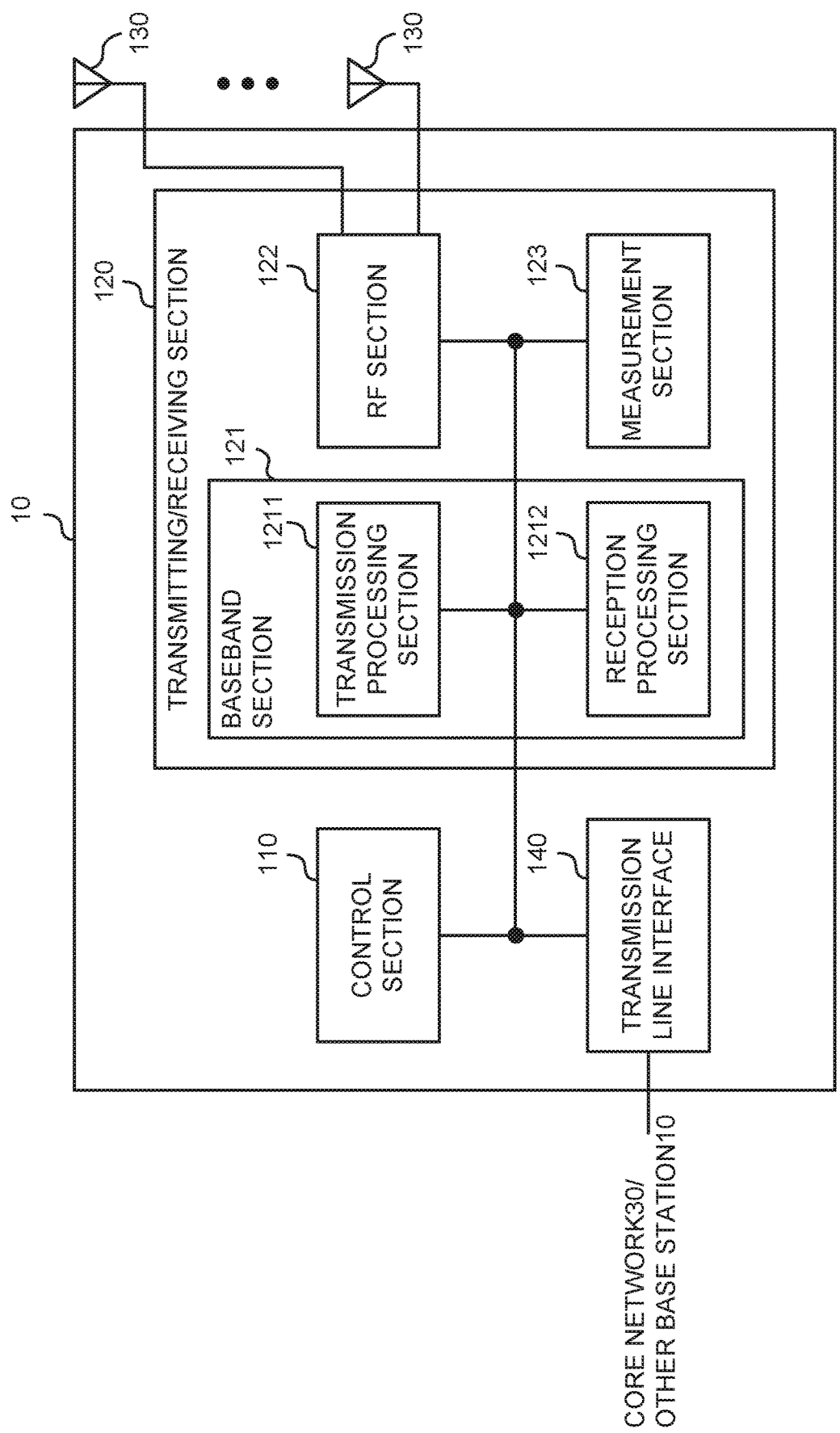
FIG. 37 is a diagram to show an example of a structure of a base station according to one embodiment.

FIG. 37 is a diagram to show an example of a structure of the base station according to one embodiment. The base station 10 includes a control section 110, a transmitting/receiving section 120, transmitting/receiving antennas 130 and a communication path interface 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120.

The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmission beam and a reception beam by using digital beam foaming (for example, precoding), analog beam foaming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the control section 110 may receive a phase tracking reference signal (PTRS) for uplink control channel (PUCCH) from the user terminal 20. The control section 110 may perform reduction (compensation) of the phase noise of the PUCCH based on the PTRS.

(User Terminal)

Figure 38:
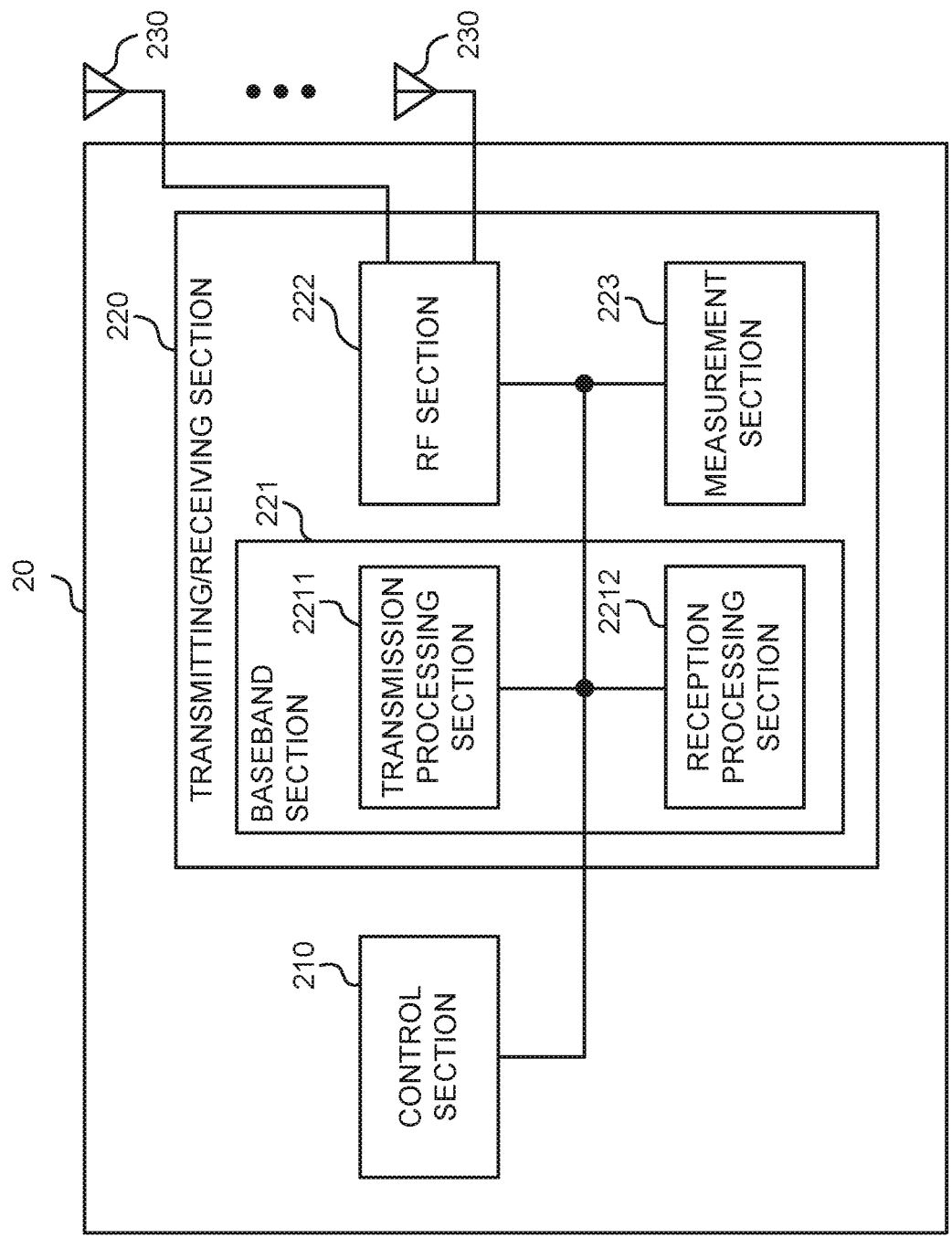
FIG. 38 is a diagram to show an example of a structure of a user terminal according to one embodiment.

FIG. 38 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmission beam and a reception beam by using digital beam foaming (for example, precoding), analog beam foaming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive a first channel state information (CSI)-reference signal (RS) based on the sequence having a peak-to-average power ratio (PAPR) which is lower than the PAPR of the pseudo-random sequence. The control section 210 may perform measurement by using the first CSI-RS.

The first CSI-RS may be associated with a first value of a parameter (for example, a parameter in the CSI-RS resource) indicating at least one of the cyclic shift of the frequency domain, the cyclic shift of the time domain, the orthogonal cover code of the frequency domain (FD-OCC), the orthogonal cover code of the time domain (TD-OCC), the frequency resource (for example, the frequency resource that is multiplexed by FDM with CSI-RS of other antenna ports), the time resource (for example, the time resource that is multiplexed by TDM with CSI-RS of other antenna ports), comb, and the spread code, and a first antenna port (for example, at least one of an antenna port and an antenna port group). A second CSI-RS may be associated with a second value of the parameter and a second antenna port.

The first CSI-RS may be transmitted from a first transmitter (for example, TRP #1), the second CSI-RS may be transmitted from a second transmitter (for example, TRP #2), and the first CSI-RS and the second CSI-RS may be multiplexed by frequency division multiplexing (second embodiment/CSI-RS transmission method 1).

The subcarrier spacing of the first CSI-RS may be greater than the subcarrier spacing of a channel or a signal of a specific type (first embodiment/SCS).

The first CSI-RS may be transmitted in a frequency that is higher than the frequency range of Rel. 15.

The transmitting/receiving section 220 may receive channel state information (CSI)-reference signal (RS). The control section 210 may perform measurement by using either of the first band (for example, the CSI-RS transmission band) in which the CSI-RS is transmitted, and the second band (for example, the CSI-RS resource band) which is configured for the CSI-RS (second embodiment/CSI-RS transmission method 2, third embodiment).

Frequency hopping may be applied to at least one of the first band and the second band.

In a case where the first band includes the second band, the control section may perform measurement by using the second band.

In a case where at least part of the first band and the second band overlap each other, measurement may be performed by using the first band or the second band, or the measurement may not be performed.

In a case where the first band and the second band do not overlap each other, measurement may be performed by using the first band, or the measurement may not be performed.

The transmitting/receiving section 220 may receive a channel state information (CSI)-reference signal (RS) and a physics downlink shared channel (PDSCH) to which at least one of time division multiplexing, frequency division multiplexing, transform precoding, and sounding reference signal (SRS) structure is applied. The control section 210 may perform measurement by using the CSI-RS and demodulate the PDSCH (fourth to seventh embodiments).

The CSI-RS and the PDSCH may be multiplexed by time division multiplexing, and the CSI-RS may be transmitted first or the last in a period having the length of a certain number of symbols in which the PDSCH is transmitted (fourth embodiment/multiplexing method 1).

Transform precoding may be applied to the CSI-RS and the PDSCH (fourth embodiment/multiplexing method 2).

The CSI-RS may extend over a plurality of slots (fourth embodiment/multiplexing method 1, seventh embodiment).

In a case where transform precoding (for example, DFT-s-OFDM) is not applied to the PDSCH, the CSI-RS may be based on a pseudo-random sequence, and in a case where transform precoding is applied to the PDSCH, the CSI-RS may be based on a sequence having a peak-to-average power ratio (PAPR) which is lower than the PAPR of the pseudo-random sequence (sixth embodiment).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 39:
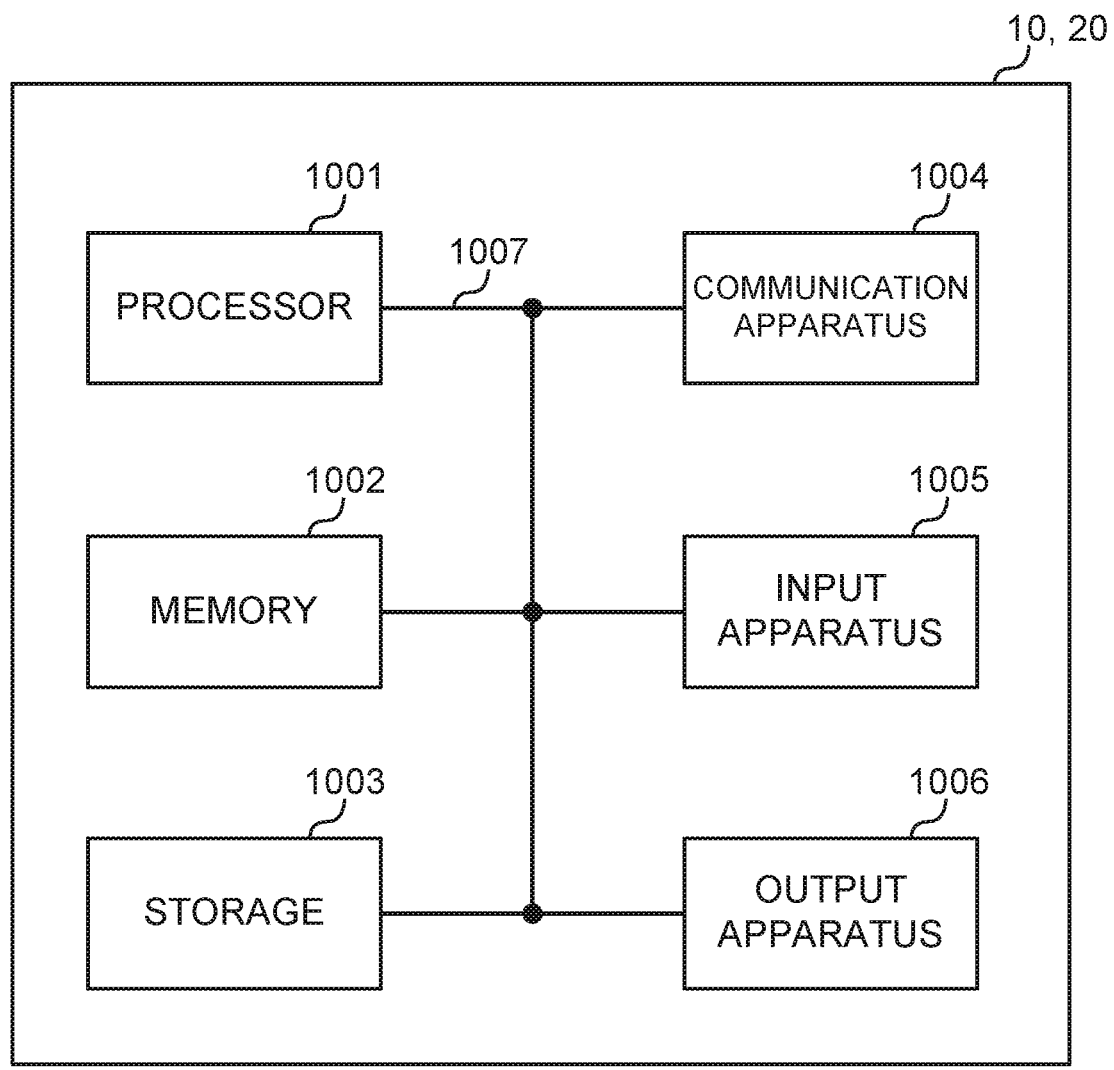
FIG. 39 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 39 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure are used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
   a receiver that receives higher layer signaling including a configuration of a first channel state information (CSI)-reference signal (RS) resource and a second CSI-RS resource; and
   a processor that performs a measurement on the first CSI-RS resource and the second CSI-RS resource based on the configuration,
   wherein the first CSI-RS resource is transmitted from a first transmission/reception point (TRP) and is associated with a plurality of first antenna ports, and the second CSI-RS resource is transmitted from a second TRP and is associated with a plurality of second antenna ports;
   the first CSI-RS resource and the second CSI-RS resource are transmitted at a same time and at a same frequency, the first CSI-RS resource and the second CSI-RS resource overlap in the same time, and the first CSI-RS resource and the second CSI-RS resource overlap in the same frequency,
   a transmission power of a CSI-RS in the first CSI-RS resource and the second CSI-RS resource is determined as a function of a ratio of a Physical Downlink Shared Channel (PDSCH) transmission power,
   each of the plurality of the first antenna ports and the plurality of the second antenna ports comprises a maximum of 32 antenna ports, and
   a first transmission configuration indicator (TCI) state of a first PDSCH associated with the first TRP indicates the first CSI-RS resource, and a second TCI state of a second PDSCH associated with the second TRP indicates the second CSI-RS resource, and wherein the plurality of the first antenna ports and the plurality of the second antenna ports do not associate with same QCL parameters.

2. The terminal according to claim 1, wherein the processor obtains a CSI by performing a measurement on the first CSI-RS resource and the second CSI-RS resource.

3. A radio communication method for a terminal comprising:
   receiving higher layer signaling including a configuration of a first channel state information (CSI)-reference signal (RS) resource and a second CSI-RS resource; and
   performing a measurement on the first CSI-RS resource and the second CSI-RS resource based on the configuration,
   wherein the first CSI-RS resource is transmitted from a first transmission/reception point (TRP) and is associated with a plurality of first antenna ports, and the second CSI-RS resource is transmitted from a second TRP and is associated with a plurality of second antenna ports;
   the first CSI-RS resource and the second CSI-RS resource are transmitted at a same time and at a same frequency, the first CSI-RS resource and the second CSI-RS resource overlap in the same time, and the first CSI-RS resource and the second CSI-RS resource overlap in the same frequency,
   a transmission power of a CSI-RS in the first CSI-RS resource and the second CSI-RS resource is determined as a function of a ratio of a Physical Downlink Shared Channel (PDSCH) transmission power,
   each of the plurality of the first antenna ports and the plurality of the second antenna ports comprises a maximum of 32 antenna ports, and
   a first transmission configuration indicator (TCI) state of a first PDSCH associated with the first TRP indicates the first CSI-RS resource, and a second TCI state of a second PDSCH associated with the second TRP indicates the second CSI-RS resource, and
   wherein the plurality of the first antenna ports and the plurality of the second antenna ports do not associate with same QCL parameters.

4. A base station comprising:
   a transmitter that transmits higher layer signaling including a configuration of a first channel state information (CSI)-reference signal (RS) resource and a second CSI-RS resource; and a processor that controls transmission of the first CSI-RS resource and the second CSI-RS resource based on the configuration, wherein the first CSI-RS resource is transmitted from a first transmission/reception point (TRP) and is associated with a plurality of first antenna ports, and the second CSI-RS resource is transmitted from a second TRP and is associated with a plurality of second antenna ports;

the first CSI-RS resource and the second CSI-RS resource are transmitted at a same time and at a same frequency, the first CSI-RS resource and the second CSI-RS resource overlap in the same time, and the first CSI-RS resource and the second CSI-RS resource overlap in the same frequency, a transmission power of a CSI-RS in the first CSI-RS resource and the second CSI-RS resource is determined as a function of a ratio of a Physical Downlink Shared Channel (PDSCH) transmission power, each of the plurality of the first antenna ports and the plurality of the second antenna ports comprises a maximum of 32 antenna ports, and a first transmission configuration indicator (TCI) state of a first PDSCH associated with the first TRP indicates the first CSI-RS resource, and a second TCI state of a second PDSCH associated with the second TRP indicates the second CSI-RS resource, and wherein the plurality of the first antenna ports and the plurality of the second antenna ports do not associate with same QCL parameters.

5. A system comprising a terminal, a first transmission/reception point (TRP) and a second TRP, wherein:

the terminal comprises:

a receiver that receives higher layer signaling including a configuration of a first channel state information (CSI)-reference signal (RS) resource and a second CSI-RS resource; and a processor that performs a measurement on the first CSI-RS resource and the second CSI-RS resource based on the configuration, wherein the first CSI-RS resource is transmitted from the first TRP and is associated with a plurality of first antenna ports, and the second CSI-RS resource is transmitted from the second TRP and is associated with a plurality of second antenna ports;

the first CSI-RS resource and the second CSI-RS resource are transmitted at a same time and at a same frequency, the first CSI-RS resource and the second CSI-RS resource overlap in the same time, and the first CSI-RS resource and the second CSI-RS resource overlap in the same frequency, a transmission power of a CSI-RS in the first CSI-RS resource and the second CSI-RS resource is determined as a function of a ratio of a Physical Downlink Shared Channel (PDSCH) transmission power, each of the plurality of the first antenna ports and the plurality of the second antenna ports comprises a maximum of 32 antenna ports, and a first transmission configuration indicator (TCI) state of a first PDSCH associated with the first TRP indicates the first CSI-RS resource, and a second TCI state of a second PDSCH associated with the second TRP indicates the second CSI-RS resource, and wherein the plurality of the first antenna ports and the plurality of the second antenna ports do not associate with same QCL parameters, the first TRP comprises:

a first transmitter that transmits the first CSI-RS resource, and the second TRP comprises:

a second transmitter that transmits the second CSI-RS resource.

* * * * *